United States Patent
Ishitani

(10) Patent No.: US 12,490,658 B2
(45) Date of Patent: Dec. 2, 2025

(54) MAGNETIZATION ROTATION ELEMENT, MAGNETORESISTANCE EFFECT ELEMENT, MAGNETIC RECORDING ARRAY, HIGH FREQUENCY DEVICE, AND METHOD FOR MANUFACTURING MAGNETIZATION ROTATION ELEMENT

(71) Applicant: TDK CORPORATION, Tokyo (JP)

(72) Inventor: Yugo Ishitani, Tokyo (JP)

(73) Assignee: TDK CORPORATION, Tokyo (JP)

( * ) Notice: Subject to any disclaimer, the term of this patent is extended or adjusted under 35 U.S.C. 154(b) by 525 days.

(21) Appl. No.: 17/909,950

(22) PCT Filed: Mar. 13, 2020

(86) PCT No.: PCT/JP2020/011035
§ 371 (c)(1),
(2) Date: Sep. 7, 2022

(87) PCT Pub. No.: WO2021/181651
PCT Pub. Date: Sep. 16, 2021

(65) Prior Publication Data
US 2023/0107965 A1   Apr. 6, 2023

(51) Int. Cl.
*H10N 52/80*       (2023.01)
*H10B 61/00*       (2023.01)
(Continued)

(52) U.S. Cl.
CPC .............. *H10N 52/80* (2023.02); *H10B 61/22* (2023.02); *H10N 50/85* (2023.02); *H10N 52/00* (2023.02); *H10N 52/01* (2023.02)

(58) Field of Classification Search
CPC ........ H10N 52/80; H10N 52/01; H10N 52/00; H10N 50/85
See application file for complete search history.

(56) References Cited

U.S. PATENT DOCUMENTS

| 8,350,347 | B2 | 1/2013 | Gaudin et al. |
| 2015/0213868 | A1 | 7/2015 | Wu et al. |

(Continued)

FOREIGN PATENT DOCUMENTS

| CN | 107689417 A | 2/2018 |
| CN | 109427965 A | 3/2019 |

(Continued)

OTHER PUBLICATIONS

Kato et al., "Observation of the Spin Hall Effect in Semiconductors," Science, Dec. 10, 2004, vol. 306, pp. 1910-1913.
Miron et al., "Perpendicular switching of a single ferromagnetic layer induced by in-plane current injection," Nature, Aug. 11, 2011, vol. 476, pp. 189-194.

(Continued)

*Primary Examiner* — Latanya N Crawford Eason
(74) *Attorney, Agent, or Firm* — Oliff PLC

(57) ABSTRACT

A magnetization rotation element includes: a spin-orbit torque wiring; a first ferromagnetic layer laminated on the spin-orbit torque wiring; and a low resistance layer laminated on a region that does not overlap the first ferromagnetic layer when viewed in a laminating direction of the spin-orbit torque wiring, the spin-orbit torque wiring includes a first region, a second region, and a third region, the first region overlaps the first ferromagnetic layer when viewed in the laminating direction, the second region does not overlap the first ferromagnetic layer and the low resistance layer when viewed in the laminating direction and is located between the first region and the third region, the third region overlaps the low resistance layer when viewed in the laminating direction, a resistivity of the low resistance layer is lower than that of the spin-orbit torque wiring, and the low resistance layer is thinner than the spin-orbit torque wiring.

17 Claims, 14 Drawing Sheets

(51) Int. Cl.
*H10N 50/85* (2023.01)
*H10N 52/00* (2023.01)
*H10N 52/01* (2023.01)

(56) References Cited

U.S. PATENT DOCUMENTS

| | | |
|---|---|---|
| 2015/0348606 A1 | 12/2015 | Buhrman et al. |
| 2017/0222135 A1 | 8/2017 | Fukami et al. |
| 2018/0040357 A1 | 2/2018 | Shirotori et al. |
| 2018/0123022 A1* | 5/2018 | Sasaki .................. H10N 50/10 |
| 2018/0350417 A1 | 12/2018 | Shiokawa et al. |
| 2019/0074124 A1 | 3/2019 | Ishitani et al. |
| 2019/0088395 A1 | 3/2019 | Ota et al. |
| 2019/0267542 A1 | 8/2019 | Komura et al. |
| 2021/0005808 A1 | 1/2021 | Sato et al. |
| 2021/0036054 A1* | 2/2021 | Gallagher ............. H10N 50/10 |

FOREIGN PATENT DOCUMENTS

| | | | |
|---|---|---|---|
| JP | 2017-510016 | A | 4/2017 |
| JP | 2018-022806 | A | 2/2018 |
| JP | 2019-047120 | A | 3/2019 |
| WO | 2016/021468 | A1 | 2/2016 |
| WO | 2017/090739 | A1 | 6/2017 |
| WO | 2019/138778 | A1 | 7/2019 |

OTHER PUBLICATIONS

Liu et al., "Spin torque switching with the giant spin Hall effect of tantalum," Science, 2012, vol. 336, pp. 1-19 and vol. 555, pp. 1-12.
Liu et al., "Current-Induced Switching of Perpendicularly Magnetized Magnetic Layers Using Spin Torque from the Spin Hall Effect," Physical Review Letters, Aug. 2012, vol. 109, 096602-1-096602-5.
Lee et al., "Threshold current for switching of a perpendicular magnetic layer induced by spin Hall effect," Applied Physics Letters, 2013, vol. 102, 112410, pp. 1-17.
Lee et al., "Thermally activated switching of perpendicular magnet by spin-orbit spin torque," Applied Physics Letters, 2014, vol. 104, 072413-1-072413-5.
Fukami et al., "Magnetization switching by spin-orbit torque in an antiferromagnet-ferromagnet bilyaer system," Nature Materials, May 2016, vol. 15, pp. 535-542.
Fukami et al., "A spin-orbit torque switching scheme with collinear magnetic easy axis and current configuration," Nature Nanotechnology, 2016, pp. 1-6.
Takahashi et al., "Spin injection and detection in magnetic nanostructures," Physical Review B, 2003, vol. 67, 052409-1-052409-4.
Jun. 16, 2020 International Search Report issued in International Patent Application No. PCT/JP2020/011035.

\* cited by examiner

MAGNETIZATION ROTATION ELEMENT, MAGNETORESISTANCE EFFECT ELEMENT, MAGNETIC RECORDING ARRAY, HIGH FREQUENCY DEVICE, AND METHOD FOR MANUFACTURING MAGNETIZATION ROTATION ELEMENT

TECHNICAL FIELD

The present invention relates to a magnetization rotation element, a magnetoresistance effect element, a magnetic recording array, a high frequency device, and a method for manufacturing a magnetization rotation element.

BACKGROUND ART

A giant magnetoresistance (GMR) element consisting of a multilayer film of ferromagnetic layers and non-magnetic layers, and a tunnel magnetoresistance (TMR) element having insulating layers (tunnel barrier layers or barrier layers) as non-magnetic layers are known as magnetoresistance effect elements. Magnetoresistance effect elements can be applied to magnetic sensors, high frequency components, magnetic heads, and non-volatile random access memories (MRAMs).

An MRAM is a storage element in which magnetoresistance effect elements are integrated. An MRAM reads and writes data by utilizing the characteristic that a resistance of a magnetoresistance effect element changes when mutual magnetization directions of two ferromagnetic layers sandwiching a non-magnetic layer in the magnetoresistance effect element change. The magnetization directions of the ferromagnetic layers are controlled by using, for example, a magnetic field generated by an electric current. Also, for example, the magnetization directions of the ferromagnetic layers are controlled by utilizing a spin transfer torque (STT) generated by passing an electric current in a laminating direction of the magnetoresistance effect element.

In the case of rewriting the magnetization directions of the ferromagnetic layers using STT, a write current flows in the laminating direction of the magnetoresistance effect element. The write current causes deterioration of characteristics of the magnetoresistance effect element.

In recent years, attention has been focused on methods that do not require an electric current to flow in a laminating direction of a magnetoresistance effect element during writing. One such method is a writing method using a spin-orbit torque (SOT) (for example, Patent Document 1). An SOT is induced by a spin current generated by spin-orbit interaction or the Rashba effect at an interface of dissimilar materials. An electric current for inducing an SOT in a magnetoresistance effect element flows in a direction intersecting a laminating direction of the magnetoresistance effect element. That is, it is not necessary to pass an electric current in the laminating direction of the magnetoresistance effect element, and thus the magnetoresistance effect element is expected to have a longer life span.

CITATION LIST

Patent Document

[Patent Document 1]
International Patent Publication No. WO2017/090739

SUMMARY OF INVENTION

Technical Problem

In order to obtain a large SOT, it is necessary to use a material that exhibits a large spin-orbit interaction for a wiring. For example, heavy metals such as Ta and W are said to have large spin Hall angles and exhibit large spin-orbit interactions. However, these heavy metals have high electrical resistances and become a heat source. Heat generated in a wiring has the effect of assisting with magnetization rotation during writing of data, but also deteriorates the wiring, which may cause the wiring to break in some cases.

For example, in an element described in Patent Document 1, a spin-orbit torque wiring has a low resistance portion. However, in the element described in Patent Document 1, some portions consist only of low resistance portion in a length direction of the spin-orbit torque wiring, and generated heat is transferred in the length direction of the wiring. When the heat generated in a spin current generation portion of the spin-orbit torque wiring escapes in the length direction of the wiring through the low resistance portions, the effect of assisting with magnetization rotation cannot be obtained during writing of data, and the wiring may deteriorate due to accumulation of heat in a thin wiring.

The present invention has been made in view of the above circumstances, and an object thereof is to provide a magnetization rotation element, a magnetoresistance effect element, a magnetic recording array, and a high frequency device, in which writing of data can be facilitated while heat generation in a wiring is inhibited. It is also an object of the present invention to provide a manufacturing method thereof.

Solution to Problem

The present invention provides the following means in order to solve the above problems.

(1) A magnetization rotation element according to a first aspect includes: a spin-orbit torque wiring; a first ferromagnetic layer laminated on the spin-orbit torque wiring; and a low resistance layer laminated on a region that does not overlap the first ferromagnetic layer when viewed in a laminating direction of the spin-orbit torque wiring, the spin-orbit torque wiring includes a first region, a second region, and a third region, the first region overlaps the first ferromagnetic layer when viewed in the laminating direction, the second region does not overlap the first ferromagnetic layer and the low resistance layer when viewed in the laminating direction and is located between the first region and the third region, the third region overlaps the low resistance layer when viewed in the laminating direction, a resistivity of the low resistance layer is lower than that of the spin-orbit torque wiring, and the low resistance layer is thinner than the spin-orbit torque wiring.

(2) In the magnetization rotation element according to the above aspect, a film thickness of a first end of the low resistance layer on the first ferromagnetic layer side may be thinner than a film thickness of a second end of the low resistance layer located at a position far from the first ferromagnetic layer.

(3) The magnetization rotation element according to the above aspect may further include an oxide layer that is in contact with a side surface of the first ferromagnetic layer and the second region of the spin-orbit torque wiring.

(4) In the magnetization rotation element according to the above aspect, the oxide layer may be an oxide made of a material constituting the low resistance layer.

(5) In the magnetization rotation element according to the above aspect, the low resistance layer may contain any one selected from the group consisting of Be, Na, Mg, Al, Ca, Co, Cu, Zn, Mo, Rh, Ag, Ir, and Au as a main component.

(6) In the magnetization rotation element according to the above aspect, the low resistance layer may further contain an element having an atomic number larger than that of yttrium as a sub-component.

(7) In the magnetization rotation element according to the above aspect, the low resistance layer may be discontinuous in cross-sections in a length direction and the laminating direction of the spin-orbit torque wiring.

(8) The magnetization rotation element according to the above aspect may further include a protruding portion that protrudes from the low resistance layer at a position separated from a boundary between the second region and the third region when viewed in the laminating direction and has conductivity.

(9) In the magnetization rotation element according to the above aspect, an apex of the protruding portion may be located at a position lower than a surface of the first ferromagnetic layer on a side opposite to a surface that is in contact with the spin-orbit torque wiring.

(10) In a cross-section of the magnetization rotation element according to the above aspect orthogonal to the length direction of the spin-orbit torque wiring, an area obtained by combining the protruding portion and the low resistance layer may be larger than an area of the spin-orbit torque wiring.

(11) In the magnetization rotation element according to the above aspect, the spin-orbit torque wiring may contain an element constituting the low resistance layer.

(12) In the magnetization rotation element according to the above aspect, a concentration of the element constituting the low resistance layer in the spin-orbit torque wiring may be reduced in the order of the third region, the second region, and the first region.

(13) The magnetization rotation element according to the above aspect may further include a second oxide layer that covers the low resistance layer.

(14) A magnetoresistance effect element according to a second aspect includes: the magnetization rotation element according to the above aspect; and a non-magnetic layer and a second ferromagnetic layer that are sequentially laminated on the surface of the first ferromagnetic layer on the side opposite to the spin-orbit torque wiring.

(15) A magnetic recording array according to a third aspect includes a plurality of the magnetoresistance effect elements according to the above aspect.

(16) A high frequency device according to a fourth aspect includes the magnetoresistance effect element according to the above aspect.

(17) A method for manufacturing a magnetization rotation element according to a fifth aspect includes: laminating a wiring layer and a magnetic layer in order; processing the magnetic layer into a desired shape to form a first ferromagnetic layer; laminating a conductive layer having a lower electric resistance than the wiring layer on the wiring layer; laminating an interlayer insulating layer that covers the wiring layer, the first ferromagnetic layer, and the conductive layer; and processing the wiring layer and the conductive layer into a desired shape via the interlayer insulating layer to form a spin-orbit torque wiring and a low resistance layer.

(18) The method for manufacturing a magnetization rotation element according to the above aspect may further include etching a conductive material adhering to a side wall of the first ferromagnetic layer after laminating the conductive layer.

(19) The method for manufacturing a magnetization rotation element according to the above aspect may further include oxidizing the conductive material adhering to the side wall of the first ferromagnetic layer after laminating the conductive layer.

Advantageous Effects of Invention

The magnetization rotation element, the magnetoresistance effect element, the magnetic recording array, and the high frequency device according to the present embodiment can facilitate writing of data while inhibiting heat generation in a wiring.

DESCRIPTION OF EMBODIMENTS

Figure 1:
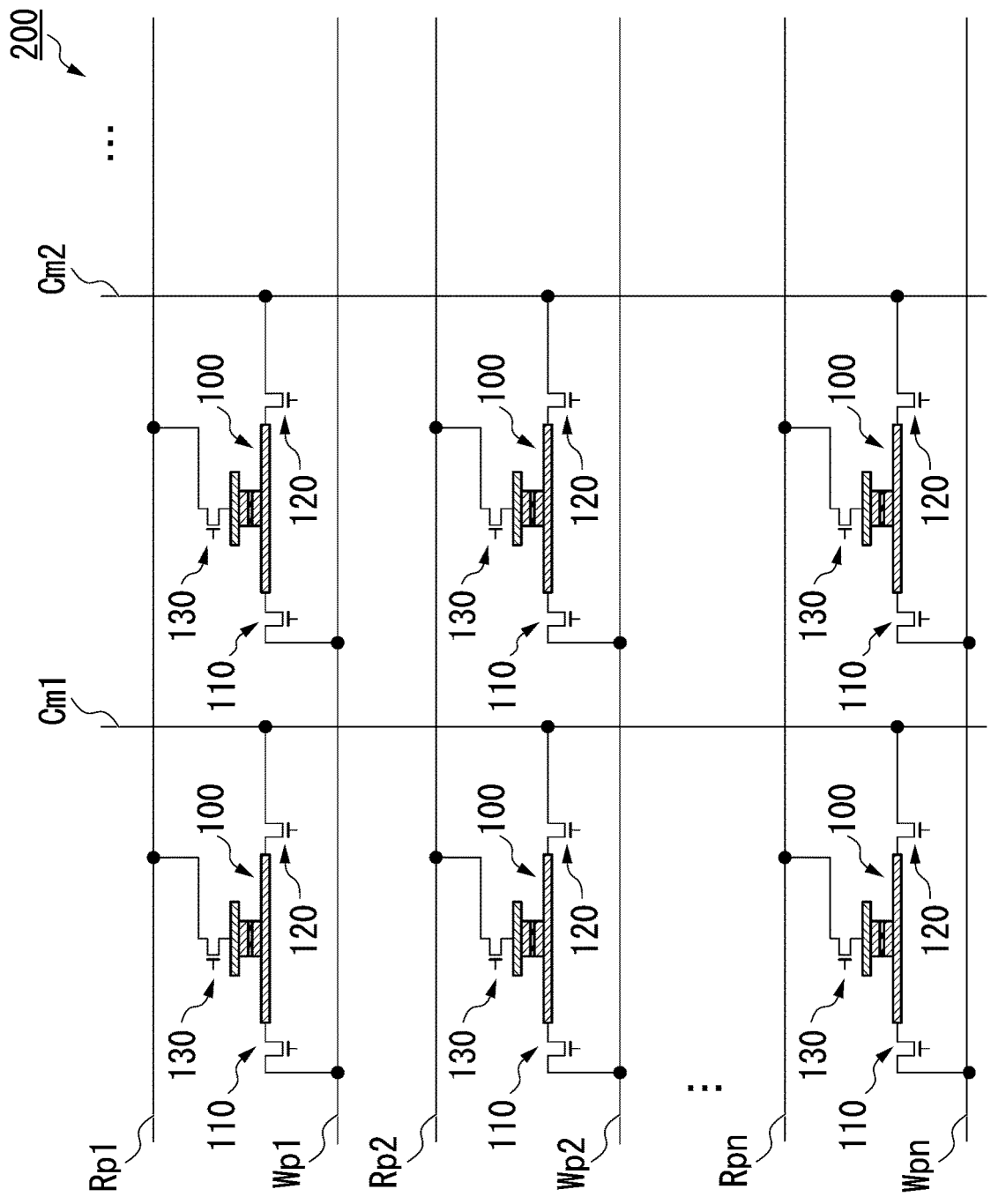
FIG. 1 is a schematic diagram of a magnetic recording array according to a first embodiment.

The present embodiment will be described in detail below with reference to the drawings as appropriate. In the drawings used in the following description, featured portions may be enlarged and shown for convenience in order to make features easy to understand, and dimensional ratios or the like of respective constituent elements may be different from the actual ones. Materials, dimensions, and the like in the following description are exemplary examples, and the present invention is not limited thereto and can be appropriately modified and carried out within the range in which the effects of the present invention are achieved.

First, directions will be defined. One direction along one surface of a substrate Sub (see FIG. 2), which will be described later, is defined as an x direction, and a direction orthogonal to the x direction is defined as a y direction. The x direction is, for example, a direction in which a spin-orbit torque wiring 20, which will be described later, extends and is a length direction of the spin-orbit torque wiring 20. The z direction is a direction orthogonal to the x direction and the y direction. The z direction is an example of a laminating direction. Hereinafter, a +z direction may be expressed as "upward" and a −z direction may be expressed as "downward." The upward and downward directions do not always coincide with the direction in which gravity is applied.

As used herein, "extending in the x direction" means that, for example, a dimension in the x direction is larger than the smallest dimension among dimensions in the x direction, the y direction, and the z direction. The same applies to extension in other directions. In addition, the term "connection" as used herein is not limited to the case of being physically connected. For example, "connection" may mean not only that two layers are physically in contact with each other, but also that two layers are connected with another layer interposed therebetween. Further, "connection" may also refer to a case in which two members are electrically connected to each other.

First Embodiment

FIG. 1 is a block diagram of a magnetic recording array 200 according to a first embodiment. The magnetic recording array 200 includes a plurality of magnetoresistance effect elements 100, a plurality of write wirings Wp1 to Wpn, a plurality of common wirings Cm1 to Cmn, a plurality of read wirings Rp1 to Rpn, a plurality of first switching elements 110, a plurality of second switching elements 120, and a plurality of third switching elements 130. The magnetic recording array 200 can be used for, for example, a magnetic memory.

Each of the write wirings Wp1 to Wpn electrically connects a power supply to one or more magnetoresistance effect elements 100. The common wirings Cm1 to Cmn are wirings used for both writing and reading data. Each of the common wirings Cm1 to Cmn electrically connects a reference potential to one or more magnetoresistance effect elements 100. The reference potential is, for example, ground. The common wirings Cm1 to Cmn may be provided in each of the plurality of magnetoresistance effect elements 100, or may be provided across the plurality of magnetoresistance effect elements 100. Each of the read wirings Rp1 to Rpn electrically connects the power supply to one or more magnetoresistance effect elements 100. The power supply is connected to the magnetic recording array 200 during use.

The first switching elements 110, the second switching elements 120, and the third switching elements 130 shown in FIG. 1 are connected to the respective magnetoresistance effect elements 100. The first switching elements 110 are connected between the magnetoresistance effect elements 100 and the write wirings Wp1 to Wpn respectively. The second switching elements 120 are connected between the magnetoresistance effect elements 100 and the common wirings Cm1 to Cmn respectively. The third switching elements 130 are connected between the magnetoresistance effect elements 100 and the read wirings Rp1 to Rpn respectively.

When the first switching elements 110 and the second switching elements 120 are turned on, write current flow between the write wirings Wp1 to Wpn connected to predetermined magnetoresistance effect elements 100 and the common wirings Cm1 to Cmn. When the second switching elements 120 and the third switching elements 130 are turned on, read current flow between the common wirings Cm1 to Cmn connected to predetermined magnetoresistance effect elements 100 and the read wirings Rp1 to Rpn.

The first switching elements 110, the second switching elements 120, and the third switching elements 130 are elements that control a flow of an electric current. The first switching elements 110, the second switching elements 120, and the third switching elements 130 are, for example, transistors, elements that utilize a phase change of a crystal layer such as ovonic threshold switches (OTSs), elements that utilize a change in band structure such as metal-insulator transition (MIT) switches, elements that utilize a breakdown voltage such as Zener diodes and avalanche diodes, or elements whose conductivity changes as atomic positions change.

Any of the first switching elements 110, the second switching elements 120, and the third switching elements 130 may be shared by the magnetoresistance effect elements 100 connected to the same wiring. For example, in the case in which the first switching elements 110 are shared, one first switching element 110 is provided upstream in each of the write wirings Wp1 to Wpn. For example, in the case in which the second switching elements 120 are shared, one second switching element 120 is provided upstream in each of the common wirings Cm1 to Cmn. For example, in the case in which the third switching elements 130 are shared, one third switching element 130 is provided upstream in each of the read wirings Rp1 to Rpn.

Figure 2:
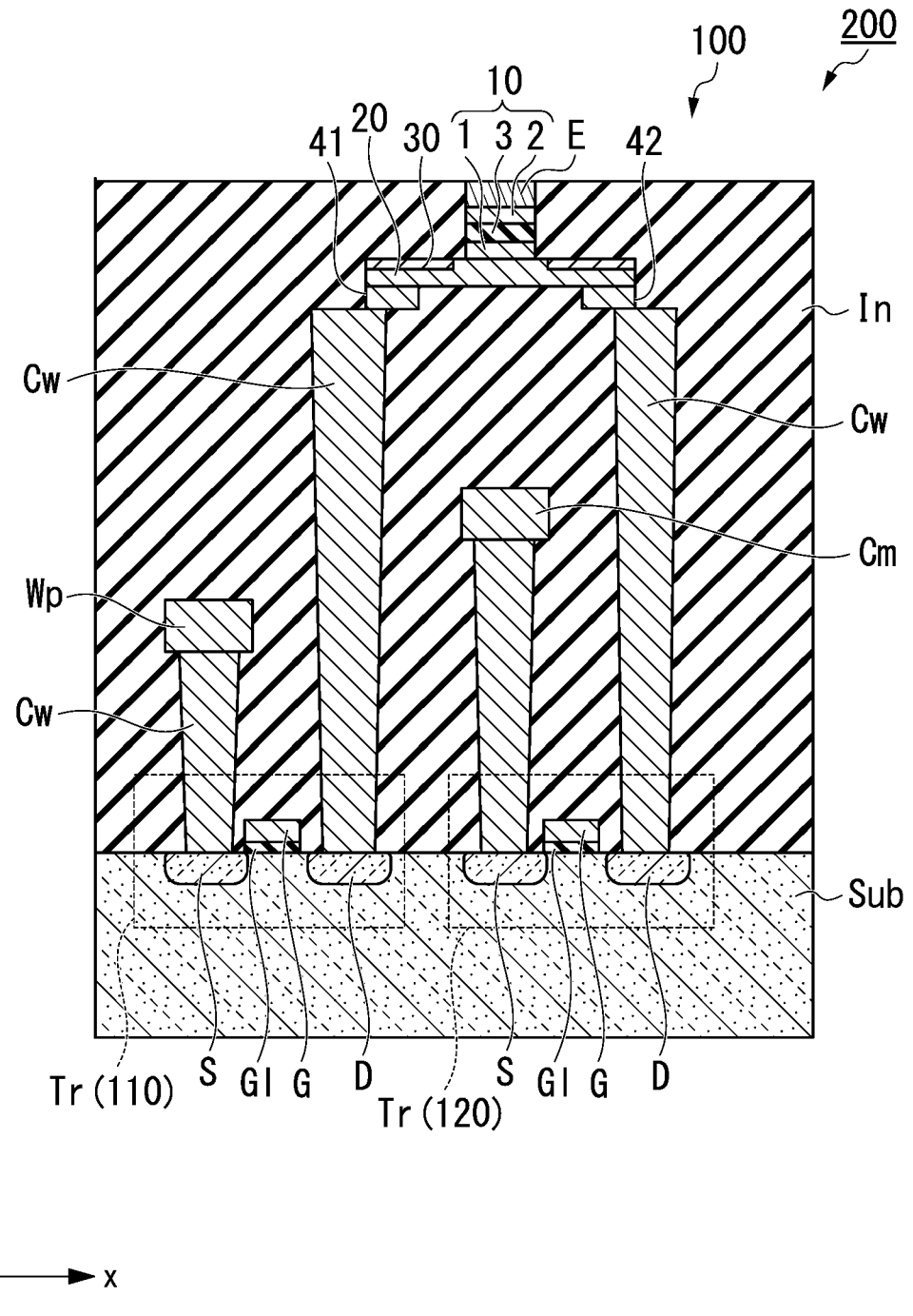
FIG. 2 is a cross-sectional view of a featured portion of the magnetic recording array according to the first embodiment.

FIG. 2 is a cross-sectional view of a featured portion of the magnetic recording array 200 according to the first embodiment. FIG. 2 is a cross-section of the magnetoresistance effect element 100 cut along an xz plane that passes through a center of a width in the y direction of the spin-orbit torque wiring 20, which will be described later.

The first switching element 110 and the second switching element 120 shown in FIG. 2 are transistors Tr. The third switching element 130 is electrically connected to an electrode E and is located, for example, in the y direction of FIG. 2. The transistors Tr are, for example, field effect transistors and each have a gate electrode G, a gate insulating film GI, and a source S and a drain D that are formed on the substrate Sub. The substrate Sub is, for example, a semiconductor substrate.

The transistors Tr and the magnetoresistance effect element 100 are electrically connected via conductive portions 41 and 42 and the connection wirings Cw. Further, the transistors Tr and the write wiring Wp or the common wiring Cm are connected by the connection wirings Cw. The connection wirings Cw may be referred to as via wirings, for example. The connection wirings Cw contain a material having conductivity. The connection wirings Cw extend in the z direction, for example.

Peripheries of the magnetoresistance effect element 100 and the transistors Tr are covered with an insulating layer In. The insulating layer In is an interlayer insulating layer that insulates between wirings of multilayer wiring and between elements. The insulating layer In is, for example, silicon oxide ($SiO_x$), silicon nitride ($SiN_x$), silicon carbide (SiC), chromium nitride, silicon carbide (SiCN), silicon oxynitride (SiON), aluminum oxide ($Al_2O_3$), and zirconium oxide ($ZrO_x$), or the like.

Figure 3:
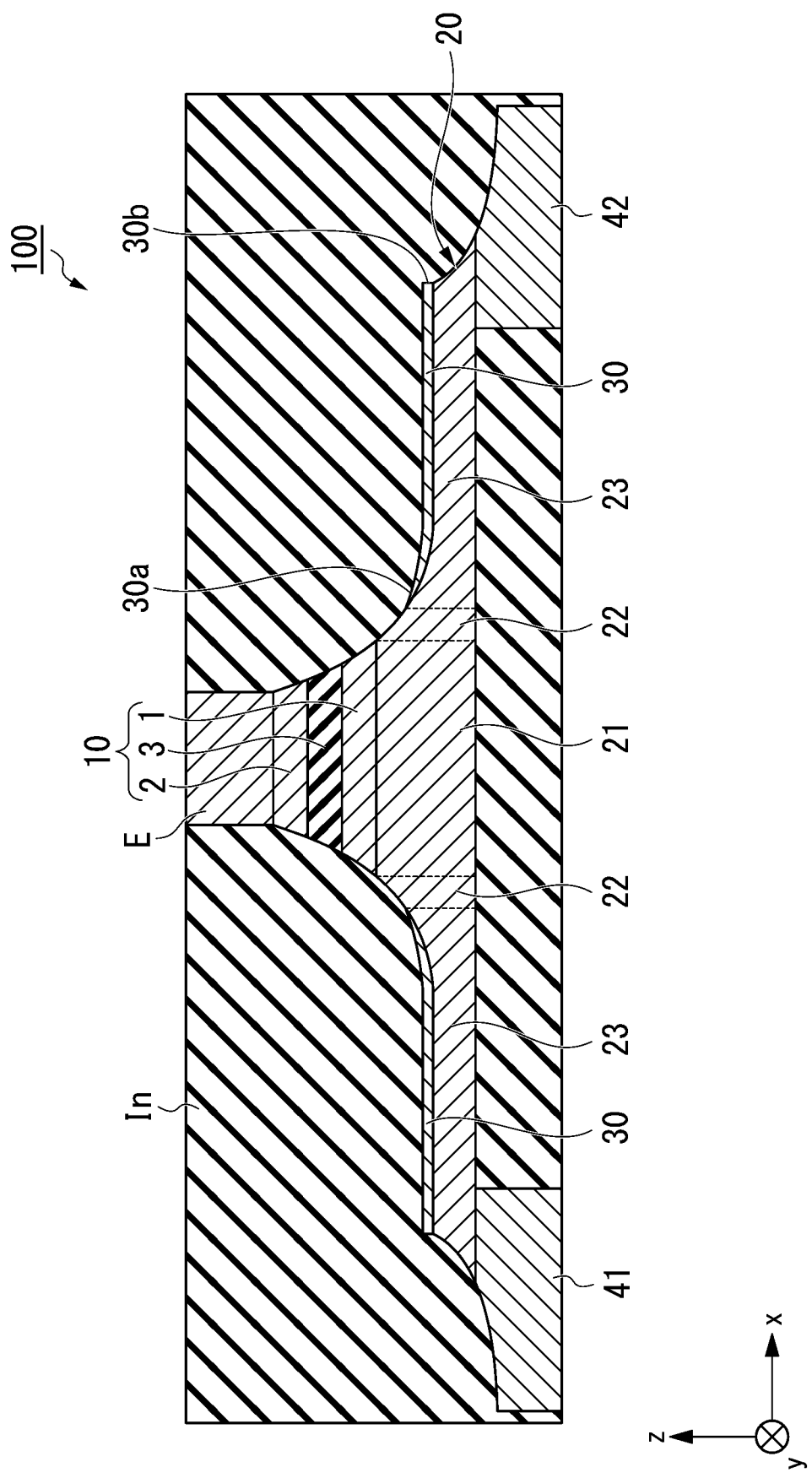
FIG. 3 is a cross-sectional view of a magnetoresistance effect element according to the first embodiment.
Figure 4:
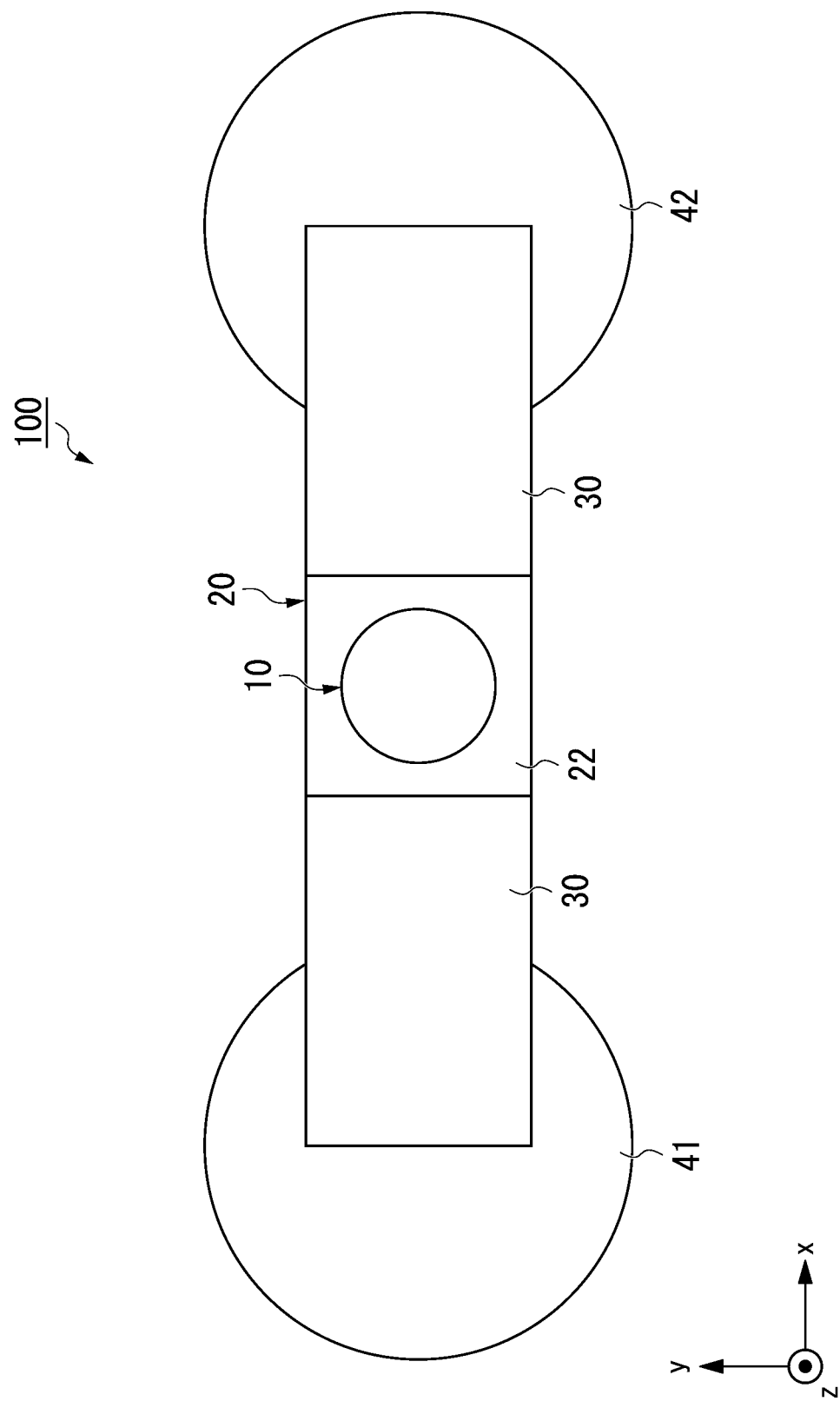
FIG. 4 is a plan view of the magnetoresistance effect element according to the first embodiment.

FIG. 3 is a cross-sectional view of the magnetoresistance effect element 100 according to the first embodiment. FIG. 4 is a plan view of the magnetoresistance effect element 100 according to the first embodiment. FIG. 3 is a cross-section of the magnetoresistance effect element 100 cut in the xz plane that passes through the center of the width of the spin-orbit torque wiring 20 in the y direction. FIG. 4 is a plan view of the magnetoresistance effect element 100 in the z direction.

The magnetoresistance effect element 100 includes a laminate 10, the spin-orbit torque wiring 20, a low resistance layer 30, a conductive portion 41, a conductive portion 42, and the electrode E. By injecting spins into the laminate 10 from the spin-orbit torque wiring 20, a resistance value of the laminate 10 in the z direction changes. The magnetoresistance effect element 100 is a magnetic element using a spin-orbit torque (SOT) and may be referred to as a spin-orbit torque type magnetoresistance effect element, a spin injection type magnetoresistance effect element, or a spin current magnetoresistance effect element.

The laminate 10 is laminated on the spin-orbit torque wiring 20. Other layers may be provided between the laminate 10 and the spin-orbit torque wiring 20. The laminate 10 is sandwiched between the spin-orbit torque wiring 20 and the electrode E in the z direction. The laminate 10 is a columnar body. The shape of the laminate 10 viewed in the z direction in a plan view is, for example, a circle, an ellipse, or a quadrangle.

The laminate 10 has a first ferromagnetic layer 1, a second ferromagnetic layer 2, and a non-magnetic layer 3. The first ferromagnetic layer 1 is in contact with, for example, the spin-orbit torque wiring 20 and is laminated on the spin-orbit torque wiring 20. The spins are injected into the first ferromagnetic layer 1 from the spin-orbit torque wiring 20. Magnetization of the first ferromagnetic layer 1 changes its orientation direction due to the spin-orbit torque (SOT) caused by injected spins. The second ferromagnetic layer 2 is in the z direction of the first ferromagnetic layer 1. The first ferromagnetic layer 1 and the second ferromagnetic layer 2 sandwich the non-magnetic layer 3 in the z direction.

The first ferromagnetic layer 1 and the second ferromagnetic layer 2 each have magnetization. An orientation direction of the magnetization of the second ferromagnetic layer 2 is less likely to change than that of the magnetization of the first ferromagnetic layer 1 when a predetermined external force is applied. The first ferromagnetic layer 1 may be referred to as a magnetization free layer, and the second ferromagnetic layer 2 may be referred to as a magnetization pinned layer or a magnetization reference layer. The resistance value of the laminate 10 changes in accordance with a difference in relative angles of the magnetization between the first ferromagnetic layer 1 and the second ferromagnetic layer 2 sandwiching the non-magnetic layer 3.

The first ferromagnetic layer 1 and the second ferromagnetic layer 2 each include a ferromagnetic material. The ferromagnetic material is, for example, a metal selected from the group consisting of Cr, Mn, Co, Fe, and Ni, an alloy containing one or more of these metals, an alloy containing these metals and at least one element of B, C, and N, or the like. The ferromagnetic material is, for example, Co—Fe, Co—Fe—B, Ni—Fe, a Co—Ho alloy, a Sm—Fe alloy, a Fe—Pt alloy, a Co—Pt alloy, or a CoCrPt alloy.

The first ferromagnetic layer 1 and the second ferromagnetic layer 2 may contain a Heusler alloy. The Heusler alloy includes an intermetallic compound with a chemical composition of XYZ or $X_2YZ$. X is a transition metal element or noble metal element of a Co, Fe, Ni, or Cu group on the periodic table, Y is a transition metal of a Mn, V, Cr or Ti group or an elemental species of X, and Z is a typical element of groups 111 to V. The Heusler alloy is, for example, $Co_2FeSi$, $Co_2FeGe$, $Co_2FeGa$, $Co_2MnSi$, $Co_2Mn_{1-a}Fe_aAl_bSi_{1-b}$, $Co_2FeGe_{1-c}Ga_c$, and the like. The Heusler alloy has a high spin polarizability.

The laminate 10 may have an antiferromagnetic layer on a surface of the second ferromagnetic layer 2 on a side opposite to the non-magnetic layer 3 via a spacer layer. The second ferromagnetic layer 2, the spacer layer, and the antiferromagnetic layer form a synthetic antiferromagnetic structure (SAF structure). The synthetic antiferromagnetic structure includes two magnetic layers sandwiching the non-magnetic layer. Antiferromagnetic coupling between the second ferromagnetic layer 2 and the antiferromagnetic layer increases a coercive force of the second ferromagnetic layer 2 as compared with a case of not including the antiferromagnetic layer. The antiferromagnetic layer is, for example, IrMn, PtMn, or the like. The spacer layer contains, for example, at least one selected from the group consisting of Ru, Ir, and Rh.

The laminate 10 may have a layer other than the first ferromagnetic layer 1, the second ferromagnetic layer 2, and the non-magnetic layer 3. For example, an underlayer may be provided between the spin-orbit torque wiring 20 and the laminate 10. The underlayer enhances crystallinity of each layer constituting the laminate 10.

The spin-orbit torque wiring 20 is in contact with, for example, one surface of the laminate 10. The spin-orbit torque wiring 20 is an example of wiring and is a write wiring for writing of data to the magnetoresistance effect element 100. For example, the spin-orbit torque wiring 20 has a longer length in the x direction than in the y direction when viewed in the z direction and extends in the x direction. At least a portion of the spin-orbit torque wiring 20 sandwiches the first ferromagnetic layer 1 together with the non-magnetic layer 3 in the z direction.

The spin-orbit torque wiring 20 generates a spin current due to the spin Hall effect when an electric current I flows therethrough and injects spins into the first ferromagnetic layer 1. The spin-orbit torque wiring 20 applies, for example, a spin-orbit torque (SOT) that can sufficiently reverse the magnetization of the first ferromagnetic layer 1 to the magnetization of the first ferromagnetic layer 1. The spin Hall effect is a phenomenon in which a spin current is induced in a direction orthogonal to a direction in which an electric current flows on the basis of spin-orbit interaction when the electric current is flowed. The spin Hall effect is common to a normal Hall effect in that a moving (flowing) charge (electrons) can bend a moving (flowing) direction thereof. In the normal Hall effect, a moving direction of charged particles moving in a magnetic field is bent by a Lorentz force. On the other hand, in the spin Hall effect, even in the absence of a magnetic field, a moving direction of spins is bent only by movement of electrons (only by a flow of an electric current).

For example, when an electric current flows through the spin-orbit torque wiring 20, a first spin oriented in one direction and a second spin oriented in a direction opposite to the first spin respectively bend in directions orthogonal to a direction in which the electric current I flows due to the spin Hall effect. For example, the first spin oriented in the −y direction bends in the +z direction, and the second spin oriented in the +y direction bends in the −z direction.

In a non-magnetic material (a material that is not a ferromagnetic material), the number of electrons in the first spin and the number of electrons in the second spin generated by the spin Hall effect are equal. That is, the number of electrons in the first spin oriented in the +z direction is equal to the number of electrons in the second spin oriented in the −z direction. The first spin and the second spin flow in a direction of eliminating an uneven distribution of spins. In movements of the first spin and the second spin in the z direction, the flow of the charges cancel each other out, and thus the amount of an electric current becomes zero. A spin current without an electric current is especially called a pure spin current.

When the flow of electrons of the first spin is expressed as $J_\uparrow$, the flow of electrons of the second spin is expressed as $J_\downarrow$, and the spin current is $J_S$, it is defined as $J_S=J_\uparrow-J_\downarrow$. The spin current $J_S$ is generated in the z direction. The first spin is injected into the first ferromagnetic layer 1 from the spin-orbit torque wiring 20.

The spin-orbit torque wiring 20 includes any of a metal, an alloy, an intermetallic compound, a metal boride, a metal carbide, a metal silicide, and a metal phosphide which have a function of generating the spin current due to the spin Hall effect when the electric current I flows.

The spin-orbit torque wiring 20 contains, for example, a non-magnetic heavy metal as a main component. A heavy metal means a metal having a specific density of yttrium (Y) or higher. A non-magnetic heavy metal is, for example, a non-magnetic metal having an atomic number of 39 or more, which has a d-electron or an f-electron in the outermost shell. The spin-orbit torque wiring 20 is made of, for example, Hf, Ta, and W. The non-magnetic heavy metal has a stronger spin-orbit interaction than other metals. The spin Hall effect is generated due to the spin-orbit interaction, spins are likely to be unevenly distributed in the spin-orbit torque wiring 20, and thus a spin current $J_S$ is easily generated.

In addition thereto, the spin-orbit torque wiring 20 may also contain a magnetic metal. A magnetic metal is a ferromagnetic metal or an antiferromagnetic metal. A small amount of a magnetic metal contained in a non-magnetic material becomes a scattering factor for spins. The small amount is, for example, 3% or less of a total molar ratio of elements constituting the spin-orbit torque wiring 20. When the spins are scattered by the magnetic metal, the spin-orbit interaction is enhanced and a production efficiency of a spin current with respect to an electric current is increased.

The spin-orbit torque wiring 20 may include a topological insulator. A topological insulator is a substance the inside of which is an insulator or a high resistance material and a substance having a spin-polarized metallic state on its surface. In the topological insulator, an internal magnetic field is generated due to spin-orbit interaction. The topological insulator develops a new topological phase due to the effect of spin-orbit interaction even in the absence of an external magnetic field. The topological insulator can generate a pure spin current with high efficiency due to strong spin-orbit interaction and breaking of inversion symmetry at edges.

The topological insulator is, for example, SnTe, $Bi_{1.5}Sb_{0.5}Te_{1.7}Se_{1.3}$, $TlBiSe_2$, $Bi_2Te_3$, $Bi_{1-x}Sb_x$, $(Bi_{1-x}Sb_x)_2Te_3$, and the like. The topological insulator can generate a spin current with high efficiency.

The spin-orbit torque wiring 20 may contain an element constituting the low resistance layer 30, which will be described later. When the spin-orbit torque wiring 20 contains the element constituting the low resistance layer 30, a resistance value of the spin-orbit torque wiring 20 decreases, and heat generation of the spin-orbit torque wiring 20 is inhibited. In a case in which the spin-orbit torque wiring 20 contains the element constituting the low resistance layer 30, a concentration thereof is higher, for example, in the order of a third region 23, a second region 22, and a first region 21, which will be described later. It is preferable that the concentration of the element constituting the low resistance layer 30 in the first region 21 that produces spins to be injected into the first ferromagnetic layer 1 be relatively lower than that in other regions.

The spin-orbit torque wiring 20 is divided into the first region 21, the second region 22, and the third region 23. The first region 21 is a region that overlaps the first ferromagnetic layer 1 when viewed in the z direction. The second region 22 is a region that does not overlap either the first ferromagnetic layer 1 or the low resistance layer 30 when viewed in the z direction. The third region 23 is a region that overlaps the low resistance layer 30 when viewed in the z direction. For example, the first region 21, the second region 22, and the third region 23 are located near the first ferromagnetic layer 1 in order. The second region 22 is located, for example, between the first region 21 and the third region 23.

For example, the thickness of the spin-orbit torque wiring 20 gradually decreases to a predetermined value toward a side away from the first ferromagnetic layer 1. The thickness of the first region 21 is thicker than the thickness of the second region 22, and the thickness of the second region 22 is thicker than the thickness of the third region 23.

The low resistance layer 30 extends on the spin-orbit torque wiring 20. The low resistance layer 30 is located in a region that does not overlap the laminate 10 when viewed in the z direction.

The low resistance layer 30 has a lower resistivity than the spin-orbit torque wiring 20. The low resistance layer 30 includes, for example, any one selected from the group consisting of Be, Na, Mg, Al, Ca, Co, Cu, Zn, Mo, Rh, Ag, Ir, and Au as a main component. A main component means that it occupies 50% or more of a material constituting the low resistance layer 30. The low resistance layer 30 is, for example, any simple substance metal or alloy selected from the group consisting of Be, Na, Mg, Al, Ca, Co, Cu, Zn, Mo, Rh, Ag, Ir, and Au.

The low resistance layer 30 may further contain an element having a specific gravity of yttrium (Y) or higher as a sub-component. The sub-component has a smaller abundance ratio than the main component and occupies, for example, 20% or less of the material constituting the low resistance layer 30. When the low resistance layer 30 contains a heavy metal, migration of the low resistance layer 30 can be inhibited. Further, the spin Hall effect can increase the amount of spins generated in the low resistance layer 30.

The low resistance layer 30 is thinner than the spin-orbit torque wiring 20. The film thickness of a first end 30a of the low resistance layer 30 is thinner than the film thickness of a second end 30b thereof. The first end 30a of the low resistance layer 30 is an end portion of the low resistance layer 30 on the first ferromagnetic layer 1 side. The second end 30b is an end portion of the low resistance layer 30 on a side opposite to the first end 30a and is an end portion of the low resistance layer 30 located at a position far from the first ferromagnetic layer 1. The film thickness of the low resistance layer 30 gradually increases to a constant value toward a side away from the first end 30a.

The thickness of the low resistance layer 30 is, for example, less than or equal to 5 times of a bond radius of the element constituting the low resistance layer 30. A bond radius is a value that is half a distance between re-adjacent atoms of crystal of the element constituting the low resistance layer 30. The bond radius can be calculated from a size of a crystal lattice described in the database (https://crystdb.nims.go.jp/) of the National Institute for Materials Science (NIMS). Even if the low resistance layer 30 is not crystallized, the bond radius is calculated from the size of the crystal lattice. Specifically, the thickness of the low resistance layer 30 is, for example, 10 Å or less.

The conductive portion 41 and the conductive portion 42 sandwich the laminate 10 in the x direction in a plan view seen in the z direction. The conductive portions 41 and 42 are connected to, for example, the connection wiring Cw. The conductive portions 41 and 42 are made of a material having excellent conductivity. The conductive portions 41 and 42 include, for example, any one selected from the group consisting of Ag, Cu, Co, Al, and Au.

The electrode E is located on a side opposite to the spin-orbit torque wiring 20 of the laminate 10. The electrode E is in contact with, for example, the second ferromagnetic layer 2 of the laminate 10. The electrode E is made of a conductive material. The electrode E includes, for example, any one selected from the group consisting of Al, Cu, Ta, Ti, Zr, NiCr, and nitrides (for example, TiN, TaN, and SiN). The electrode E is, for example, a laminate of NiCr and Ta. The electrode E may function as a cap layer of the laminate 10. Also, the electrode E may function as a hard mask used in a manufacturing process of the magnetoresistance effect element 100.

The electrode E may be made of, for example, a transparent electrode material. The electrode E may be, for example, indium zinc oxide (IZO), indium-tin oxide (ITO), tin oxide ($SnO_2$), an antimony oxide-tin oxide based material (ATO), zinc oxide (ZnO), fluorine-doped tin oxide (FTO), indium oxide ($In_2O_3$), and the like. When the electrode E is transparent, the orientation direction of the magnetization of the first ferromagnetic layer 1 or the second ferromagnetic layer 2 can be easily read from the outside.

Next, a method for manufacturing the magnetoresistance effect element 100 will be described. The method for manufacturing the magnetoresistance effect element 100 includes, for example, a first laminating step, a first processing step, a second laminating step, a first insulating step, and a second processing step.

First, before the first laminating step, a base for laminating a laminated film is prepared. First, impurities are doped at predetermined positions on the substrate Sub to form the sources S and the drains D. Next, the gate insulating films GI and the gate electrodes G are formed between the sources S and the drains D. The sources S, the drains D, the gate insulating films GI, and the gate electrodes G serve as the transistors Tr.

Next, an insulating layer having a certain thickness is formed to cover the transistors Tr. Further, the connection wirings Cw are formed by forming opening portions in the insulating layer and filling the opening portions with a conductor. The write wirings Wp and the common wirings Cm are formed by laminating an insulating layer to a predetermined thickness, then forming grooves in the insulating layer, and filling the grooves with a conductor.

Next, an insulating layer having a certain thickness covering them is further laminated. Then, by forming openings at positions overlapping the connection wirings Cw and filling them with a conductor, the conductive portions 41 and 42 can be obtained. For the conductive portions 41 and 42, for example, a material harder than the connection wirings Cw is used. Surfaces of the insulating layer and the conductive portions 41 and 42 are chemically mechanically polished (CMP). By using a hard material for the conductive portions 41 and 42, flatness of the surfaces is enhanced.

Next, the first laminating step is performed. In the first laminating step, a wiring layer, a magnetic layer, a non-magnetic layer, and a magnetic layer are laminated in order on the base in which the insulating layer In and the conductive portions 41 and 42 are exposed on the surfaces. Each layer is laminated using, for example, a sputtering method, a chemical vapor deposition (CVD) method, an electron beam vapor deposition method (EB vapor deposition method), or an atomic laser deposition method.

Next, the first processing step is performed. In the first processing step, the laminated film configured of the magnetic layer, the non-magnetic layer, and the magnetic layer is processed into a desired shape to form the laminate 10. The magnetic layers become the first ferromagnetic layer 1 or the second ferromagnetic layer 2, and the non-magnetic layer becomes the non-magnetic layer 3. The processing is performed using a known method such as photolithography. A part of the laminated film is removed and the wiring layer is exposed. A part of a surface of the wiring layer that does not overlap the laminate 10 is etched when the laminated film is processed.

Next, the second laminating step is performed. In the second laminating step, a conductive layer having a lower electrical resistance than the wiring layer is laminated on the wiring layer. The conductive layer is laminated using, for example, a sputtering method, a chemical vapor deposition (CVD) method, an electron beam vapor deposition method (EB vapor deposition method), or an atomic laser deposition method. The conductive layer is laminated on the wiring layer separated from the laminate 10 by a certain distance due to a shadow effect of the laminate 10, for example.

After the second laminating step, a conductive material adhering to a side wall of the laminate 10 may be etched. Etching is performed, for example, in an oblique direction inclined with respect to the z direction. The conductive material adhering to the side wall of the laminate 10 is removed by etching. By removing the conductive material, a short circuit between the first ferromagnetic layer 1 and the second ferromagnetic layer 2 is prevented. In addition, by removing the conductive material adhering to the side wall of the first ferromagnetic layer 1, it is possible to inhibit the flow of heat in the x direction through the conductive material and the low resistance layer 30.

Further, after the second laminating step, the conductive material adhering to the side wall of the laminate 10 may be oxidized. Oxidation reduces conductivity of the conductive material adhering to the side wall of the laminate 10. By reducing the conductivity, a short circuit between the first ferromagnetic layer 1 and the second ferromagnetic layer 2 is prevented. In addition, by lowering the conductivity of the conductive material adhering to the side wall of the first ferromagnetic layer 1, it is possible to inhibit the flow of heat in the x direction through the conductive material and the low resistance layer 30. The etching treatment and the oxidation treatment of the conductive material may be used in combination.

Next, the first insulating step is performed. In the first insulating step, an interlayer insulating layer covering the wiring layer, the laminate 10, and the conductive layer is laminated. The interlayer insulating layer is laminated using, for example, a sputtering method, a chemical vapor deposition (CVD) method, an electron beam vapor deposition method (EB vapor deposition method), or an atomic laser deposition method.

Next, the second processing step is performed. In the second processing step, the wiring layer and the conductive layer extending in an in-plane direction are processed into a predetermined shape via the interlayer insulating layer, and a connection thereof in the in-plane direction is cut. The processing is performed using a known method such as photolithography. The wiring layer becomes the spin-orbit torque wiring 20 by processing, and the conductive layer becomes the low resistance layer 30 by processing.

Next, the second insulating step is performed. In the second insulating step, openings formed for cutting the wiring layer and the conductive layer in the second processing step is filled with an insulator. Through such a procedure, the magnetic recording array 200 according to the first embodiment is obtained.

Next, an operation of the magnetoresistance effect element 100 according to the first embodiment will be described. The magnetoresistance effect element 100 has a data writing operation and a data reading operation.

First, an operation of recording data on the magnetoresistance effect element 100 will be described. First, the first switching element 110 and the second switching element 120 connected to the magnetoresistance effect element 100 in which data is to be recorded are turned on. When the first switching element 110 and the second switching element 120 are turned on, a write current flows through the spin-orbit torque wiring 20. When the write current flows through the spin-orbit torque wiring 20, the spin Hall effect occurs, and spins are injected into the first ferromagnetic layer 1. The spins injected into the first ferromagnetic layer 1 apply a spin-orbital torque (SOT) to the magnetization of the first ferromagnetic layer 1 to change the orientation direction of the magnetization of the first ferromagnetic layer 1. When the flowing direction of the electric current is reversed, the direction of the spins injected into the first ferromagnetic layer 1 is reversed, and thus the orientation direction of the magnetization can be freely controlled.

The resistance value of the laminate 10 in the laminating direction is low in a case in which the magnetization of the first ferromagnetic layer 1 and the magnetization of the second ferromagnetic layer 2 are parallel, and is high in a case in which the magnetization of the first ferromagnetic layer 1 and the second ferromagnetic layer 2 are antiparallel. Data is recorded in the magnetoresistance effect element 100 as the resistance value in the laminating direction of the laminate 10.

Next, an operation of reading data from the magnetoresistance effect element 100 will be described. First, the first switching element 110 or the second switching element 120 and the third switching element 130 connected to the magnetoresistance effect element 100 in which data is to be recorded are turned on. When each switching element is set in this way, a read current flows in the laminating direction of the laminate 10. If the resistance value of the laminate 10 varies in the laminating direction according to Ohm's law, an output voltage will vary. For that reason, for example, by reading the voltage in the laminating direction of the laminate 10, the data recorded in the magnetoresistance effect element 100 can be read out.

The magnetoresistance effect element 100 according to the first embodiment can facilitate writing of data while inhibiting heat generation in the wiring. The reason for this will be specifically described below.

The spin-orbit torque wiring 20 often contains heavy metals. Heavy metals have large electrical resistances and become a heat source. Heat generated in the spin-orbit torque wiring 20 causes deterioration of the spin-orbit torque wiring 20. On the other hand, the heat generated in the spin-orbit torque wiring 20 lowers stability of the magnetization of the first ferromagnetic layer 1 during writing, which makes it easier to write data.

Heat is particularly likely to accumulate at positions corresponding to midpoints of the spin-orbit torque wiring 20 in the x direction between the first ferromagnetic layer 1 and the conductive portions 41 and 42 when viewed in the z direction. This is because the midpoints are far from the electrode E and the conductive portions 41 and 42, which are heat discharge paths.

The low resistance layer 30 transmits heat generated in the third region 23, in which the heat tends to accumulate, to the conductive portions 41 and 42. That is, when the low resistance layer 30 is present on the third region 23, heat generation in the third region 23 is inhibited, and deterioration of the spin-orbit torque wiring 20 is inhibited.

On the other hand, there is no low resistance layer 30 on the first region 21 and the second region 22. For that reason, heat generated in the first region 21 and the second region 22 is transmitted in the z direction via the electrode E. Since the heat generated in the first region 21 and the second region 22 is less likely to flow in the x direction, stability of the magnetization of the first ferromagnetic layer 1 is lowered, and data can be easily written.

In addition, since the thickness of the low resistance layer 30 is thinner than the thickness of the spin-orbit torque wiring 20, it is possible to inhibit heat generated in the first region 21 and the second region 22 from excessively flowing in the x direction.

Further, the thickness of the low resistance layer 30 increases toward a side away from the first ferromagnetic layer 1, so that a heat discharge direction of the spin-orbit torque wiring 20 can be further controlled.

Second Embodiment

Figure 5:
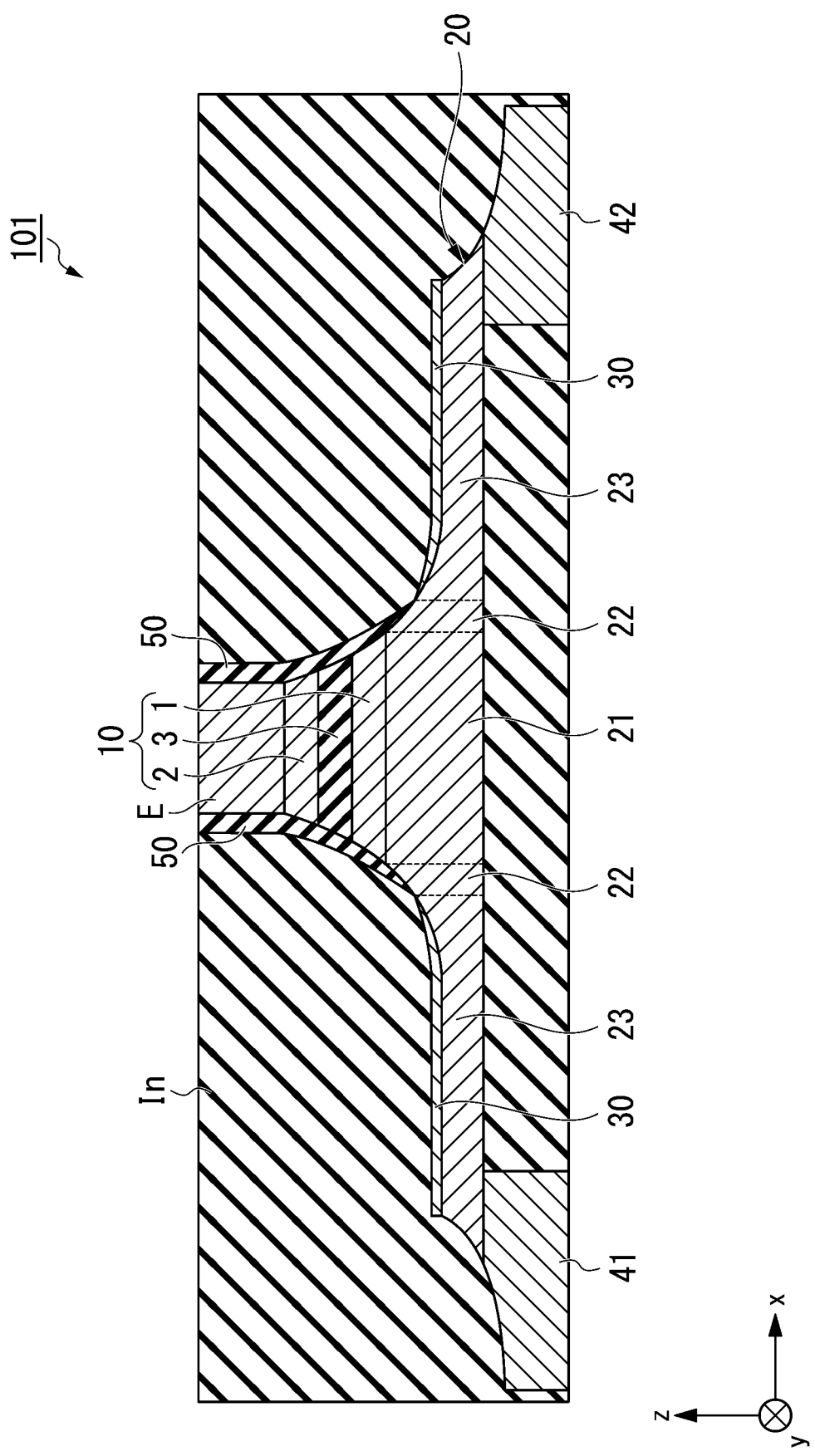
FIG. 5 is a cross-sectional view of a magnetoresistance effect element according to a second embodiment.

FIG. 5 is a cross-sectional view of a magnetoresistance effect element 101 according to a second embodiment. FIG. 5 is a cross-section of the magnetoresistance effect element 101 cut in the xz plane that passes through the center of the width of the spin-orbit torque wiring 20 in the y direction.

The magnetoresistance effect element 101 according to the second embodiment is different from the magnetoresistance effect element 100 according to the first embodiment in that an oxide layer 50 is provided. The same constituent elements as those of the magnetoresistance effect element 100 in the magnetoresistance effect element 101 will be denoted by the same reference numerals, and descriptions thereof will be omitted.

The oxide layer 50 is in contact with a side surface of the laminate 10 and the second region 22 of the spin-orbit torque wiring 20. The oxide layer 50 is in contact with at least a side surface of the first ferromagnetic layer 1 and an upper surface of the second region 22. The oxide layer 50 is, for example, an oxide of the material constituting the low resistance layer 30. As described above, the oxide layer 50 can be formed, for example, by oxidizing the conductive material after the second laminating step.

The magnetoresistance effect element 101 according to the second embodiment has the same effects as the magnetoresistance effect element 100 according to the first embodiment. In addition, the oxide layer 50 prevents a short circuit between the first ferromagnetic layer 1 and the second ferromagnetic layer 2. Further, a Rashba effect is generated at an interface between the oxide of the material constituting the low resistance layer 30 and the conductor, and an amount of spins injected into the first ferromagnetic layer 1 increases.

Third Embodiment

Figure 6:
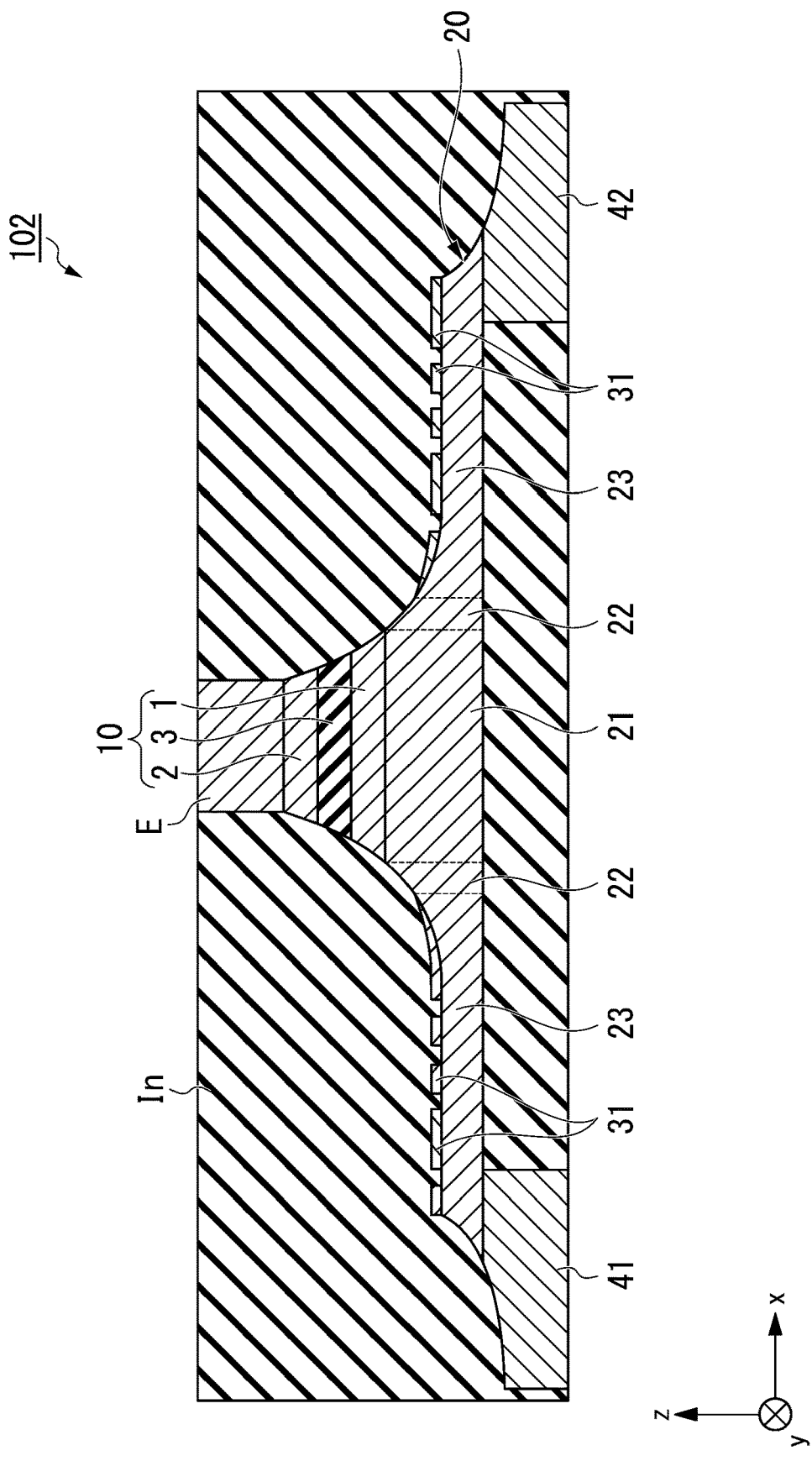
FIG. 6 is a cross-sectional view of a magnetoresistance effect element according to a third embodiment.
Figure 7:
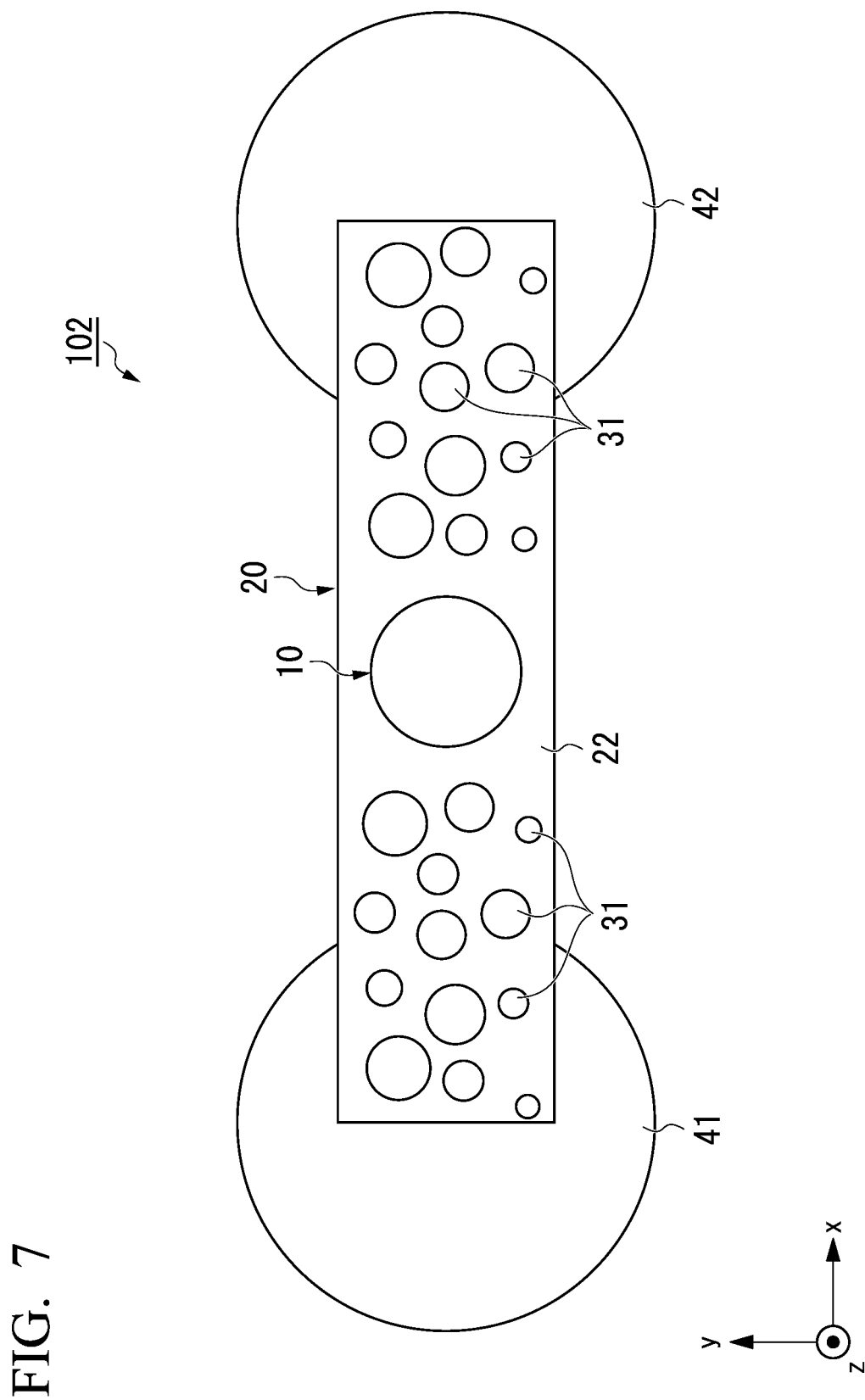
FIG. 7 is a plan view of the magnetoresistance effect element according to the third embodiment.

FIG. 6 is a cross-sectional view of a magnetoresistance effect element 102 according to a third embodiment. FIG. 6 is a cross-section of the magnetoresistance effect element 101 cut in the xz plane that passes through the center of the width of the spin-orbit torque wiring 20 in the y direction. FIG. 7 is a plan view of the magnetoresistance effect element 102 according to the third embodiment.

The shape of the low resistance layer 31 of the magnetoresistance effect element 102 according to the third embodiment is different from that of the magnetoresistance effect element 100 according to the first embodiment. The same constituent elements as those of the magnetoresistance effect element 100 in the magnetoresistance effect element 101 will be denoted by the same reference numerals, and descriptions thereof will be omitted.

The low resistance layer 31 is discontinuous in the cross-section cut along the xz plane. The low resistance layer 31 is, for example, scattered in island shapes in the xy plane. When a thickness designed for forming the low resistance layer 31 is sufficiently thin, atoms constituting the low resistance layer 31 grow into grains in island shapes and become the low resistance layer 31.

The magnetoresistance effect element 102 according to the third embodiment has the same effects as the magnetoresistance effect element 100 according to the first embodiment. In addition, since the low resistance layer 31 is discontinuous in the x direction, it is possible to inhibit transmission of heat in the x direction. For that reason, writing of data can be further facilitated while heat generation in the wiring is inhibited.

Figure 8:
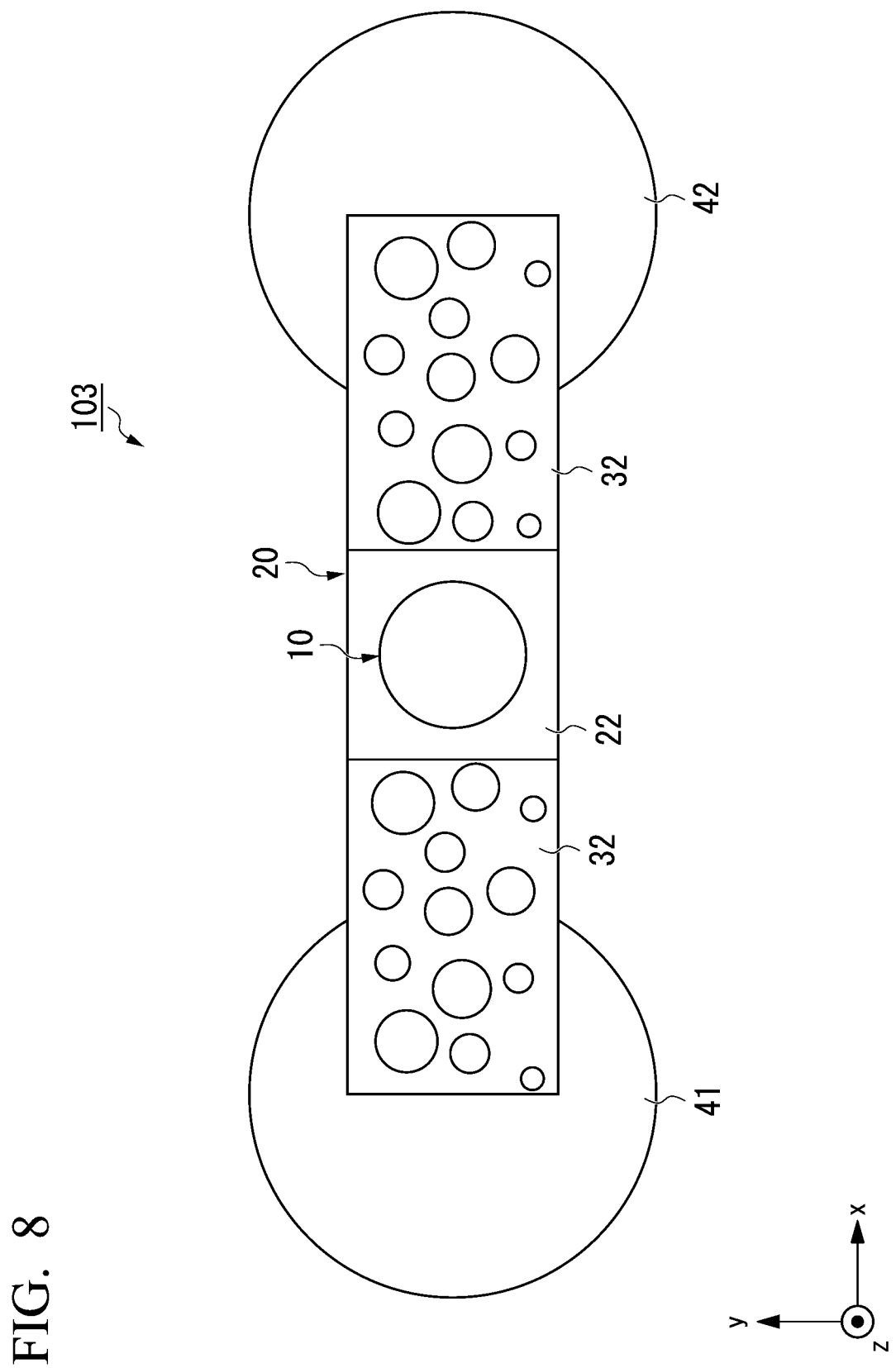
FIG. 8 is a plan view of a magnetoresistance effect element according to a first modified example.
Figure 9:
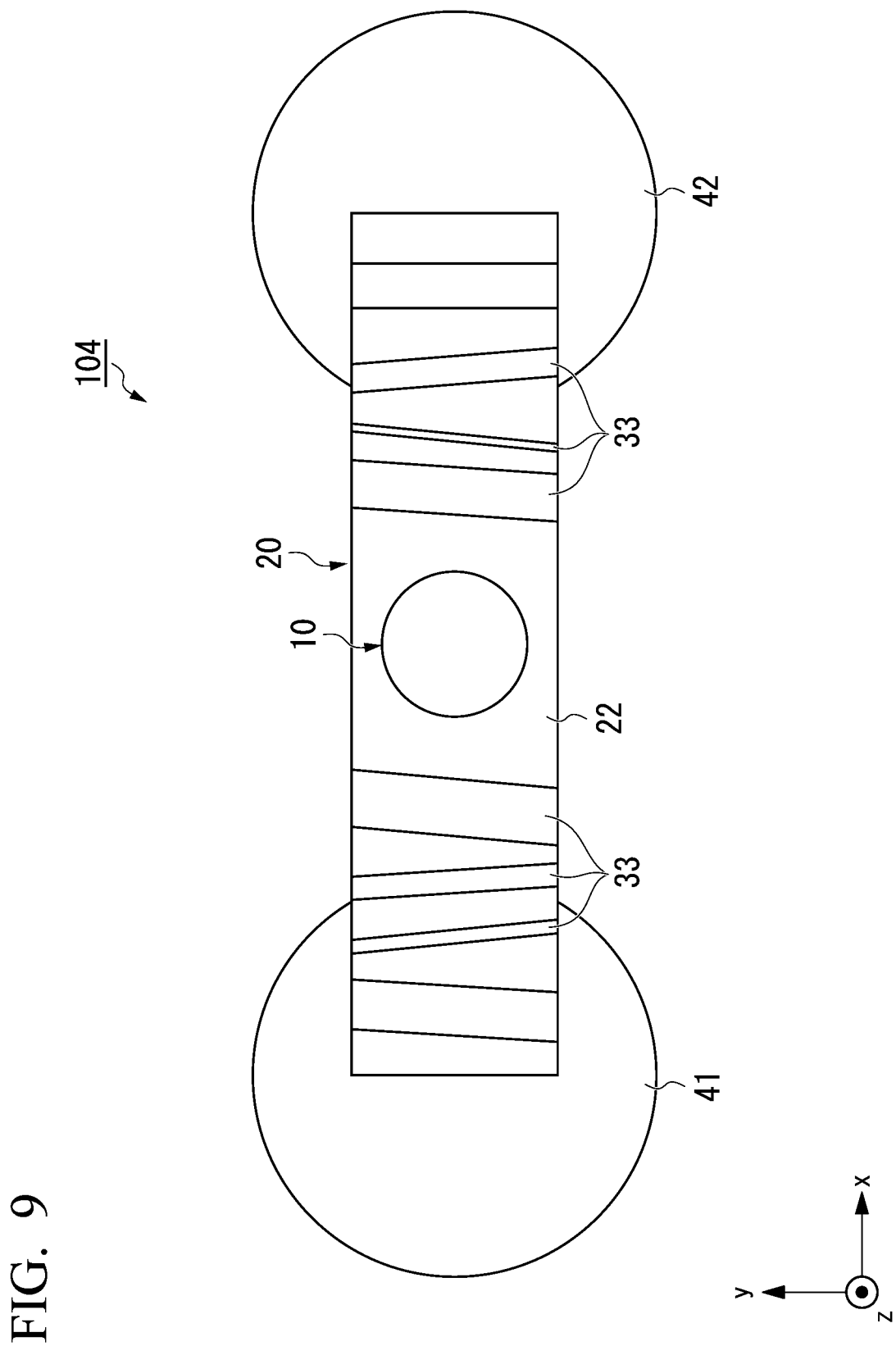
FIG. 9 is a plan view of a magnetoresistance effect element according to a second modified example.

Further, FIG. 8 is a plan view of a magnetoresistance effect element 103 according to a first modified example. FIG. 9 is a plan view of a magnetoresistance effect element 104 according to a second modified example. The magnetoresistance effect elements 103 and 104 are modified examples of the magnetoresistance effect element 102 according to the third embodiment.

A low resistance layer 32 shown in FIG. 8 and a low resistance layer 33 shown in FIG. 9 are both discontinuous in the cross-section cut along the xz plane. The low resistance layer 32 is a continuous film having a plurality of openings. The low resistance layer 33 is configured of a plurality of films formed in band shapes. In either case, transmission of heat in the x direction can be inhibited, and the same effects as those of the magnetoresistance effect element 102 according to the third embodiment can be obtained.

Fourth Embodiment

Figure 10:
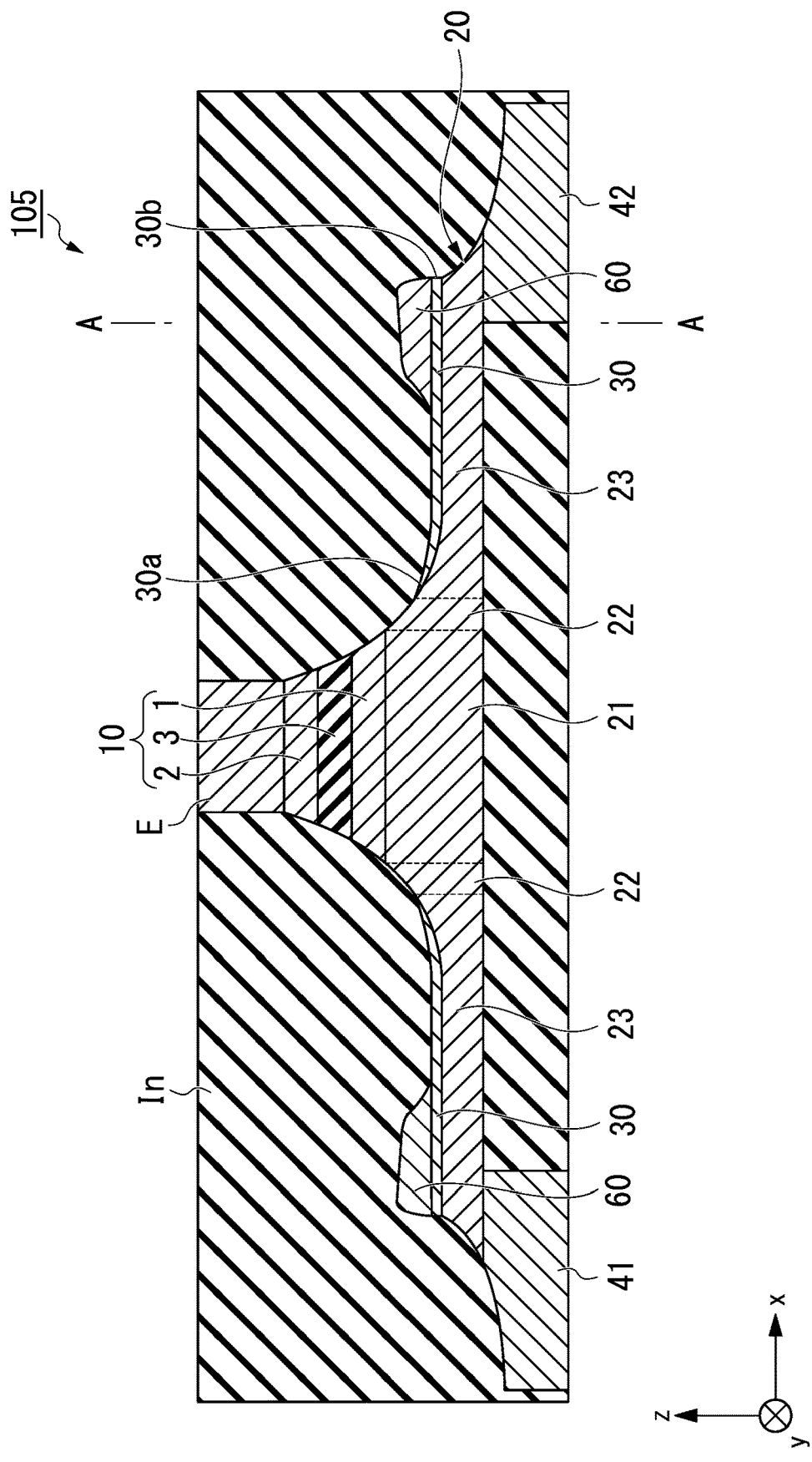
FIG. 10 is a cross-sectional view of a magnetoresistance effect element according to a fourth embodiment.

FIG. 10 is a cross-sectional view of a magnetoresistance effect element 105 according to a fourth embodiment. FIG. 10 is a cross-section of the magnetoresistance effect element 105 cut in the xz plane that passes through the center of the width of the spin-orbit torque wiring 20 in the y direction.

The magnetoresistance effect element 105 according to the fourth embodiment is different from the magnetoresistance effect element 100 according to the first embodiment in that a protruding portion 60 is provided. The same constituent elements as those of the magnetoresistance effect element 100 in the magnetoresistance effect element 105 will be denoted by the same reference numerals, and descriptions thereof will be omitted.

The protruding portion 60 protrudes from the low resistance layer 30 in the z direction at a position away from a boundary between the second region 22 and the third region 23 when viewed in the z direction. The protruding portion 60 has conductivity.

The protruding portion 60 includes a material having conductivity and is made of, for example, the same material as the low resistance layer 30. In a case in which the low resistance layer 30 and the protruding portion 60 are made of the same material, the protruding portion 60 is defined by the following procedure. In the xz plane that passes through the center of the width of the spin-orbit torque wiring 20 in the y direction, inclinations of tangent lines on the upper surface of the low resistance layer 30 are obtained in order from the first end 30a of the low resistance layer 30. In a case in which absolute values of the inclinations of the tangent lines decrease or are constant, a region on the first ferromagnetic layer 1 side from the contact point is the low resistance layer 30. On the other hand, in a case in which the absolute value of the inclination of the tangent line begins to increase, a region far from the first ferromagnetic layer 1 from the contact point is configured of the low resistance layer 30 and the protruding portion 60. A boundary line between the low resistance layer 30 and the protruding portion 60 is a straight line connecting the contact point immediately before the absolute value of the inclination of the tangent line starts to increase and an upper end of the second end 30b.

An apex of the protruding portion 60 is located at a position lower than a surface of the first ferromagnetic layer 1 on a side opposite to a surface in contact with the spin-orbit torque wiring 20.

Figure 11:
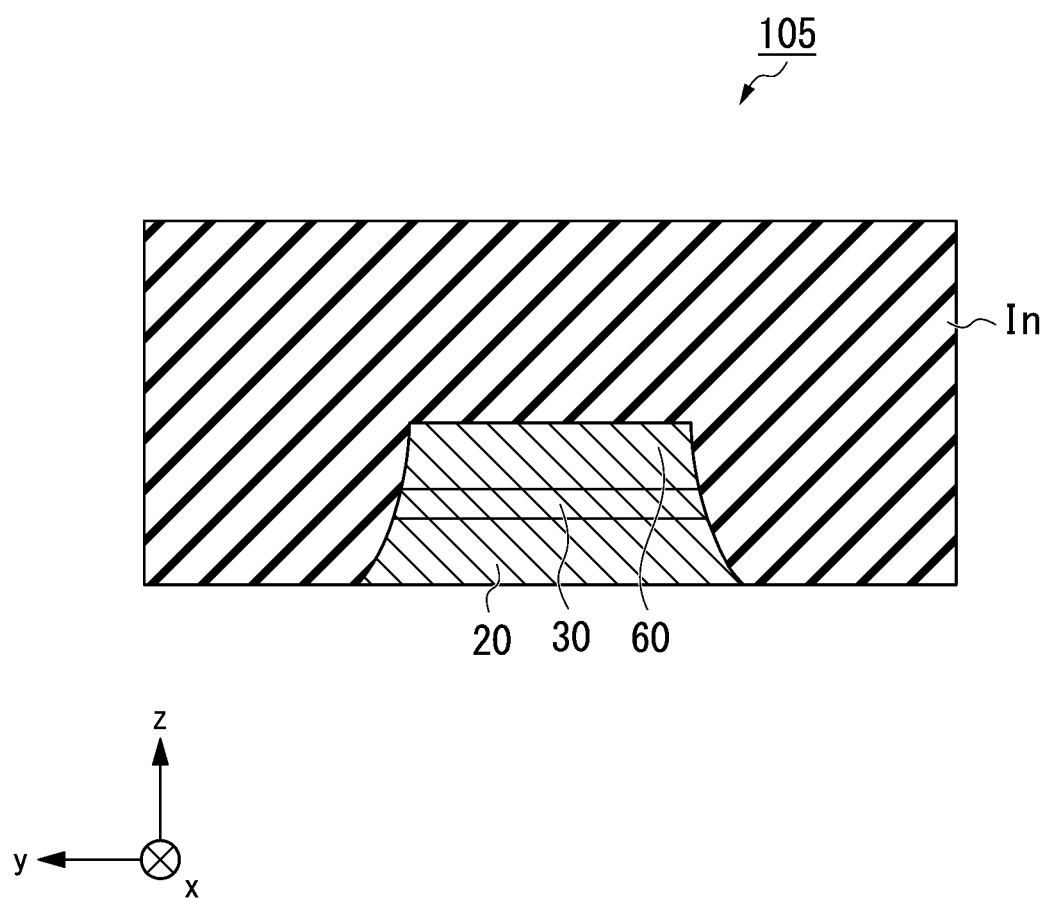
FIG. 11 is another cross-sectional view of the magnetoresistance effect element according to the fourth embodiment.

Further, FIG. 11 is another cross-sectional view of the magnetoresistance effect element 105 according to the fourth embodiment. FIG. 11 is an yz cross-section along line A-A in FIG. 10. As shown in FIG. 11, an area obtained by combining the protruding portion 60 and the low resistance layer 30 is larger than, for example, an area of the spin-orbit torque wiring 20. In addition, a width of the protruding portion 60 in the y direction is narrower than a width of the low resistance layer 30 in the y direction, and a width of the low resistance layer 30 in the y direction is narrower than a width of the spin-orbit torque wiring 20 in the y direction.

The magnetoresistance effect element 105 according to the fourth embodiment has the same effect as the magnetoresistance effect element 100 according to the first embodiment. Also, by having the protruding portion 60 at the position overlapping the third region 23 at which heat tends to be accumulated, discharge characteristics of the heat generated in the third region 23 can be enhanced. In addition, by setting the height of the protruding portion 60 to be not more than a certain value, heat transmitted from the first ferromagnetic layer 1 to the protruding portion 60 due to radiation can be reduced, and transmission of the heat in the x direction can be inhibited. For that reason, writing of data can be further facilitated while heat generation in the wiring is inhibited.

Fifth Embodiment

Figure 12:
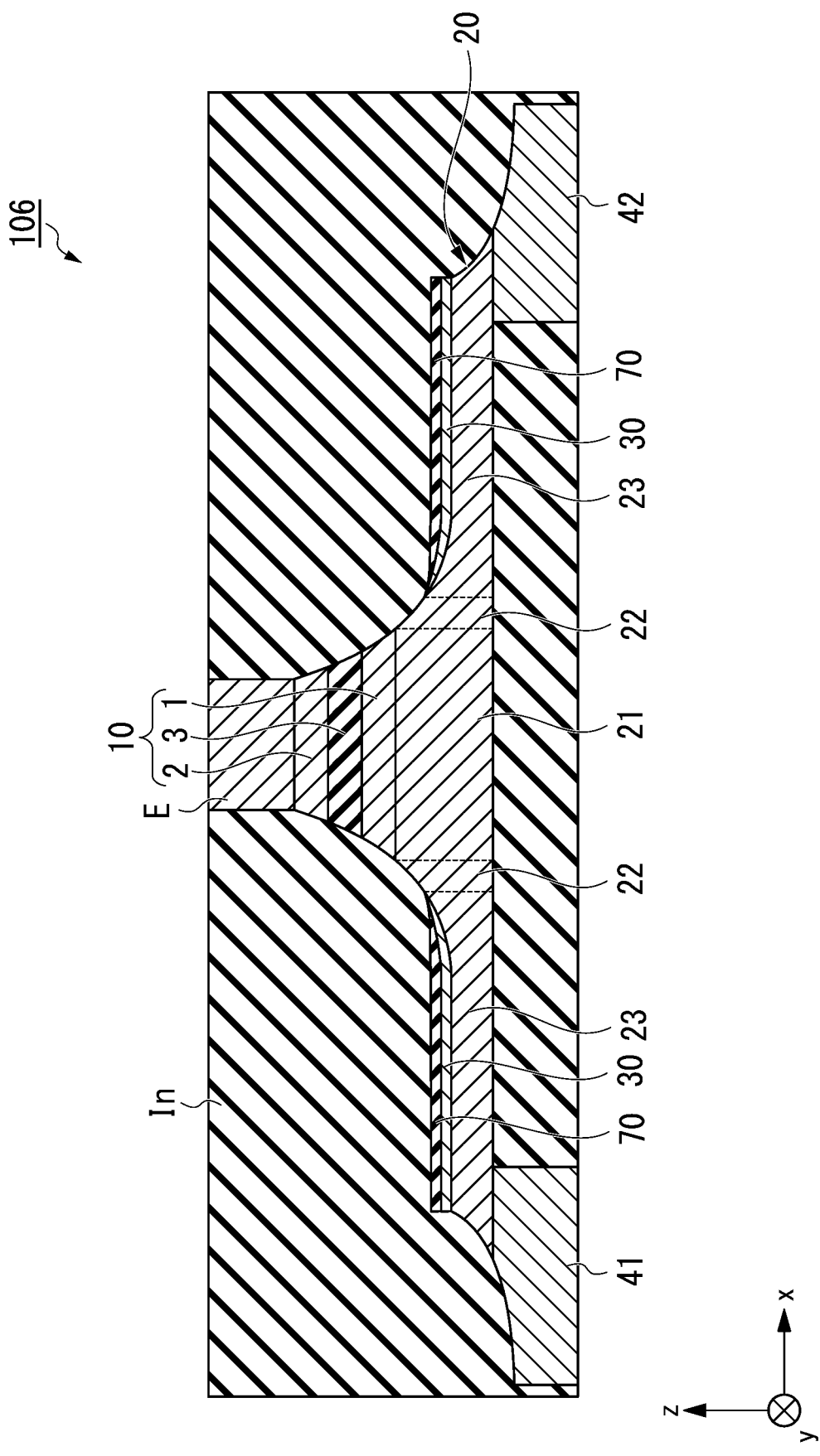
FIG. 12 is a cross-sectional view of a magnetoresistance effect element according to a fifth embodiment.

FIG. 12 is a cross-sectional view of a magnetoresistance effect element 106 according to a fifth embodiment. FIG. 12 is a cross-section of the magnetoresistance effect element 106 cut in the xz plane that passes through the center of the width of the spin-orbit torque wiring 20 in the y direction.

The magnetoresistance effect element 106 according to the fifth embodiment is different from the magnetoresistance effect element 100 according to the first embodiment in that a second oxide layer 70 is provided. The same constituent elements as those of the magnetoresistance effect element 100 in the magnetoresistance effect element 106 will be denoted by the same reference numerals, and descriptions thereof will be omitted.

The second oxide layer 70 covers the low resistance layer 30. The second oxide layer 70 is laminated on the low resistance layer 30. The second oxide layer 70 is, for example, an oxide of the material constituting the low resistance layer 30. As described above, the second oxide layer 70 can be formed, for example, by oxidizing the conductive material after the second laminating step.

The magnetoresistance effect element 106 according to the fifth embodiment has the same effects as the magnetoresistance effect element 100 according to the first embodiment. Further, a Rashba effect is generated at the interface between the oxide of the material constituting the low resistance layer 30 and the conductor, and the amount of spins injected into the first ferromagnetic layer 1 increases.

Sixth Embodiment

Figure 13:
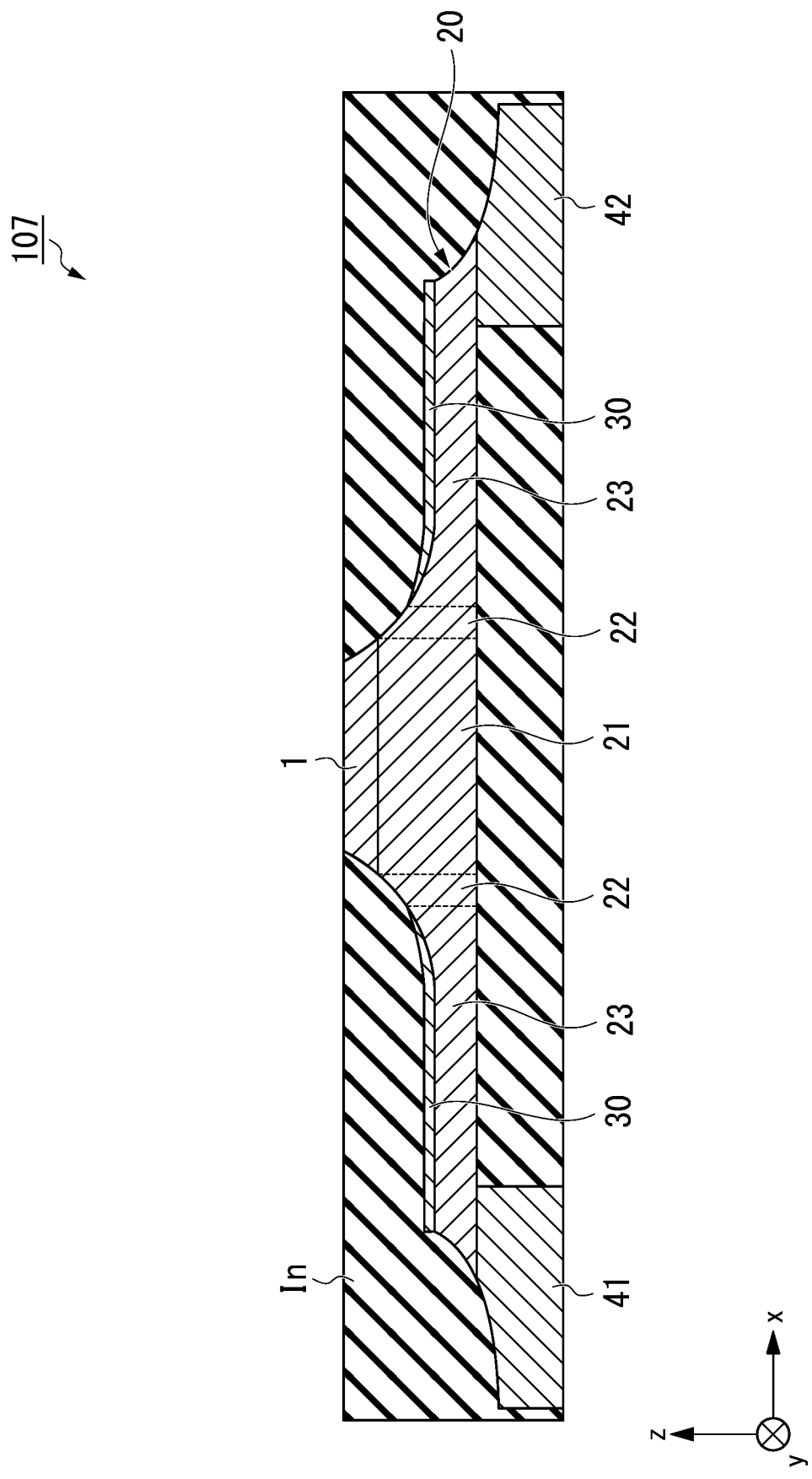
FIG. 13 is a cross-sectional view of a magnetization rotation element according to a sixth embodiment.

FIG. 13 is a cross-sectional view of a magnetization rotation element 107 according to a sixth embodiment. FIG. 13 is a cross-section of the magnetization rotation element 107 cut in the xz plane that passes through the center of the width in the y direction of the spin-orbit torque wiring 20.

The magnetization rotation element 107 according to the sixth embodiment is different from the magnetoresistance effect element 100 according to the first embodiment in that it does not have the non-magnetic layer 3 and the second ferromagnetic layer 2. The same constituent elements as those of the magnetoresistance effect element 100 in the magnetization rotation element 107 will be denoted by the same reference numerals, and descriptions thereof will be omitted.

The magnetization rotation element 107 is an example of a spin element. In the magnetization rotation element 107, for example, light is incident on the first ferromagnetic layer 1 and light reflected by the first ferromagnetic layer 1 is evaluated. When the orientation direction of the magnetization changes due to the magneto-optic Kerr effect, a deflection state of the reflected light changes. The magnetization rotation element 107 can be used, for example, as an optical element of, for example, an image display device that utilizes a difference in deflection state of light.

In addition, the magnetization rotation element 107 can be used alone as an anisotropic magnetic sensor, an optical element utilizing the magnetic Faraday effect, and the like.

The magnetization rotation element 107 according to the sixth embodiment only removes the non-magnetic layer 3 and the second ferromagnetic layer 2 and can obtain the same effects as those of the magnetoresistance effect element 100 according to the first embodiment.

As described above, preferred embodiments of the present invention have been provided as exemplary examples on the basis of the first to sixth embodiments, but the present invention is not limited to these embodiments. For example, featured configurations in each embodiment may be applied to other embodiments. Further, although an example of using the magnetoresistance effect element as a magnetic memory has been described, the magnetoresistance effect element may be applied to a high frequency device.

Figure 14:
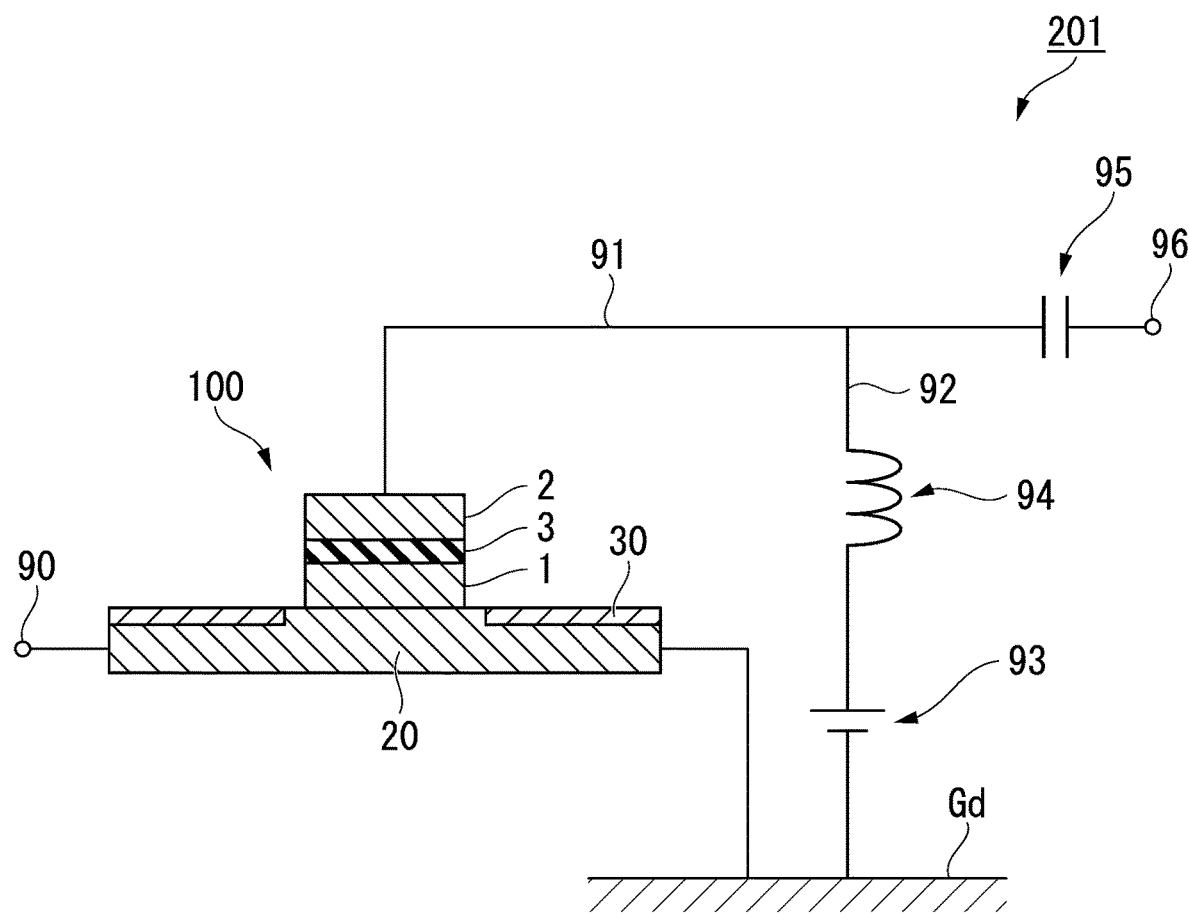
FIG. 14 is a schematic diagram of an example of a high frequency device.

FIG. 14 is an example of a high frequency device 201. The high frequency device 201 has the magnetoresistance effect element 100, an input port 90, lines 91 and 92, a DC power supply 93, an inductor 94, a capacitor 95, and an output port 96.

The line 91 connects the magnetoresistance effect element 100 to the output port 96. The line 92 branches from the line 91 and reaches a ground Gd via the inductor 94 and the DC power supply 93. For the DC power supply 93, the inductor 94, and the capacitor 95, known ones can be used. The inductor 94 cuts a high frequency component of an electric current and passes an invariant component of the electric current. The capacitor 95 passes a high frequency component of an electric current and cuts an invariant component of the electric current. The inductor 94 is disposed at a portion at which the flow of a high frequency current is desired to be inhibited, and the capacitor 95 is disposed at a portion at which the flow of a direct current is desired to be inhibited.

When an alternating current or an alternating magnetic field is applied to the spin-orbit torque wiring 20 from the input port 90, the magnetization of the first ferromagnetic layer 1 undergoes precession. The magnetization of the first ferromagnetic layer 1 oscillates strongly in a case in which the frequency of the high frequency current or high frequency magnetic field applied to the first ferromagnetic layer 1 is close to a ferromagnetic resonance frequency of the first ferromagnetic layer 1, and does not oscillate much at frequencies away from the ferromagnetic resonance frequency of the first ferromagnetic layer 1. This phenomenon is called a ferromagnetic resonance phenomenon.

The resistance value of the laminate 10 changes due to the oscillation of the magnetization of the first ferromagnetic layer 1. The DC power supply 93 applies a direct current to the laminate 10. The direct current flows in the laminating direction of the laminate 10. The direct current flows through the lines 91 and 92 and the magnetoresistance effect element 100 to the ground Gd. The potential of the laminate 10 changes according to Ohm's law. A high frequency signal is output from the output port 96 in response to a change in the potential (change in resistance value) of the laminate 10.

REFERENCE SIGNS LIST

1 First ferromagnetic layer
2 Second ferromagnetic layer
3 Non-magnetic layer
20 Spin-orbit torque wiring
21 First region
22 Second region
23 Third region
30, 31, 32, 33 Low resistance layer
30a First end
30b Second end
50 Oxide layer
60 Protruding portion
70 Second oxide layer
100, 101, 102, 103, 104, 105, 106 Magnetoresistance effect element
107 Magnetization rotation element
200 Magnetic recording array
201 High frequency device

What is claimed is:
1. A magnetization rotation element comprising:
a spin-orbit torque wiring;
a first ferromagnetic layer laminated on the spin-orbit torque wiring; and
a low resistance layer laminated on a region that does not overlap the first ferromagnetic layer when viewed in a laminating direction of the spin-orbit torque wiring, wherein:
the spin-orbit torque wiring includes a first region, a second region, and a third region,
the first region overlaps the first ferromagnetic layer when viewed in the laminating direction,
the second region does not overlap the first ferromagnetic layer and the low resistance layer when viewed in the laminating direction and is located between the first region and the third region,
the third region overlaps the low resistance layer when viewed in the laminating direction,
a resistivity of the low resistance layer is lower than that of the spin-orbit torque wiring,
the low resistance layer is thinner than the spin-orbit torque wiring, and
a film thickness of a first end of the low resistance layer on the first ferromagnetic layer side is thinner than a film thickness of a second end of the low resistance layer located at a position far from the first ferromagnetic layer.

2. The magnetization rotation element according to claim 1, further comprising an oxide layer that is in contact with a side surface of the first ferromagnetic layer and the second region of the spin-orbit torque wiring.

3. The magnetization rotation element according to claim 2, wherein the oxide layer is an oxide made of a material constituting the low resistance layer.

4. The magnetization rotation element according to claim 1, wherein the low resistance layer contains any one selected from the group consisting of Be, Na, Mg, Al, Ca, Co, Cu, Zn, Mo, Rh, Ag, Ir, and Au as a main component.

5. The magnetization rotation element according to claim 4, wherein the low resistance layer further contains an element having a specific gravity larger than that of yttrium as a sub-component.

6. The magnetization rotation element according to claim 1, wherein the low resistance layer is discontinuous in cross-sections in a length direction and the laminating direction of the spin-orbit torque wiring.

7. The magnetization rotation element according to claim 1, further comprising a protruding portion that protrudes from the low resistance layer at a position separated from a boundary between the second region and the third region when viewed in the laminating direction and has conductivity.

8. The magnetization rotation element according to claim 7, wherein an apex of the protruding portion is located at a position lower than a surface of the first ferromagnetic layer on a side opposite to a surface that is in contact with the spin-orbit torque wiring.

9. The magnetization rotation element according to claim 7, wherein, in a cross-section orthogonal to a length direction of the spin-orbit torque wiring, an area obtained by combining the protruding portion and the low resistance layer is larger than an area of the spin-orbit torque wiring.

10. The magnetization rotation element according to claim 1, wherein the spin-orbit torque wiring contains an element constituting the low resistance layer.

11. The magnetization rotation element according to claim 10,
wherein a concentration of the element constituting the low resistance layer in the third region is higher than the concentration of the element constituting the low resistance layer in the second region, and
wherein the concentration of the element constituting the low resistance layer in the second region is higher than the concentration of the element constituting the low resistance layer in the first region.

12. The magnetization rotation element according to claim 1, further comprising a second oxide layer that covers the low resistance layer.

13. A magnetoresistance effect element comprising: the magnetization rotation element according to claim 1; and a non-magnetic layer and a second ferromagnetic layer that are sequentially laminated on the surface of the first ferromagnetic layer on the side opposite to the spin-orbit torque wiring.

14. A magnetic recording array comprising a plurality of the magnetoresistance effect elements according to claim 13.

15. A high frequency device comprising the magnetoresistance effect element according to claim 13.

16. A method for manufacturing a magnetization rotation element comprising:
laminating a wiring layer and a magnetic layer in order;
processing the magnetic layer into a desired shape to form a first ferromagnetic layer;
laminating a conductive layer having a lower electric resistance than the wiring layer on the wiring layer;
laminating an interlayer insulating layer that covers the wiring layer, the first ferromagnetic layer, and the conductive layer;
processing the wiring layer and the conductive layer into a desired shape via the interlayer insulating layer to form a spin-orbit torque wiring and a low resistance layer, and
etching a conductive material adhering to a side wall of the first ferromagnetic layer after laminating the conductive layer.

17. A method for manufacturing a magnetization rotation element comprising:
laminating a wiring layer and a magnetic layer in order;
processing the magnetic layer into a desired shape to form a first ferromagnetic layer;
laminating a conductive layer having a lower electric resistance than the wiring layer on the wiring layer;
laminating an interlayer insulating layer that covers the wiring layer, the first ferromagnetic layer, and the conductive layer; and
processing the wiring layer and the conductive layer into a desired shape via the interlayer insulating layer to form a spin-orbit torque wiring and a low resistance layer, and
oxidizing the conductive material adhering to the side wall of the first ferromagnetic layer after laminating the conductive layer.

* * * * *